(12) United States Patent
Hayashi et al.

(10) Patent No.: US 8,889,763 B2
(45) Date of Patent: Nov. 18, 2014

(54) INK JET INK, INK JET RECORDING METHOD, AND INK CARTRIDGE

(75) Inventors: Katsuhiro Hayashi, Yokohama (JP); Kenji Nishiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 12/572,569

(22) Filed: Oct. 2, 2009

(65) Prior Publication Data

US 2010/0086687 A1 Apr. 8, 2010

(30) Foreign Application Priority Data

Oct. 7, 2008 (JP) .................................. 2008-260618

(51) Int. Cl.
| | |
|---|---|
| B41J 2/01 | (2006.01) |
| B41J 2/175 | (2006.01) |
| C08L 33/06 | (2006.01) |
| C09B 67/00 | (2006.01) |
| C09D 5/00 | (2006.01) |
| C09D 11/00 | (2014.01) |
| G01D 11/00 | (2006.01) |
| C09D 11/326 | (2014.01) |

(52) U.S. Cl.
CPC .................................... C09D 11/326 (2013.01)
USPC ................. 523/160; 347/1; 347/85; 347/100; 523/161; 524/560

(58) Field of Classification Search
USPC .......... 523/160, 161; 524/560; 347/1, 85, 100
See application file for complete search history.

(56) References Cited

U.S. PATENT DOCUMENTS

| | | | | |
|---|---|---|---|---|
| 4,556,683 | A | 12/1985 | Hirasawa et al. | 523/447 |
| 5,679,762 | A | 10/1997 | Yoshida et al. | 528/364 |
| 5,869,598 | A | 2/1999 | Yoshida et al. | 528/364 |
| 7,378,459 | B2 | 5/2008 | Nishiguchi | 523/160 |
| 7,629,395 | B2 | 12/2009 | Nishiguchi et al. | 523/160 |
| 2004/0212667 | A1 | 10/2004 | Nishiguchi | 347/96 |
| 2007/0287769 | A1 | 12/2007 | Nishiwaki et al. | 523/160 |
| 2008/0139740 | A1 | 6/2008 | Nishiwaki et al. | 524/556 |
| 2008/0146723 | A1 | 6/2008 | Nishiwaki et al. | 524/500 |
| 2008/0269407 | A1 | 10/2008 | Nishiguchi et al. | 524/592 |
| 2008/0292793 | A1 | 11/2008 | Yamashita et al. | 427/256 |
| 2008/0292794 | A1 | 11/2008 | Sato et al. | 427/256 |

FOREIGN PATENT DOCUMENTS

| | | |
|---|---|---|
| EP | 1 008 634 A1 | 6/2000 |
| EP | 1770131 A1 | 4/2007 |
| JP | 59-124922 | 7/1984 |
| JP | 63-162640 | 7/1988 |
| JP | 7-179538 | 7/1995 |
| JP | 7-206809 | 8/1995 |
| JP | 9-249709 | 9/1997 |
| JP | 11-209459 | 8/1999 |
| JP | 2000-169771 | 6/2000 |
| JP | 2001-040256 | 2/2001 |
| JP | 2005-213679 | 8/2005 |

OTHER PUBLICATIONS

G.J. Fleer, et al., Polymers at Interfaces, Springer, 1993, pp. 27-42.
H.J. Spinelli, "Polymeric Dispersants in Ink Jet Technology", Advanced Materials, Wiley VCH Verlad, vol. 10, No. 15, Oct. 20, 1998, pp. 1215-1218.
Feb. 4, 2010 European Search Report in European Patent Application No. 09172308.0.

*Primary Examiner* — Patrick Niland
(74) *Attorney, Agent, or Firm* — Fitzpatrick, Cella, Harper & Scinto

(57) ABSTRACT

To provide an ink jet ink capable of achieving both high colorability and excellent bleeding resistance of an image and having excellent storage stability, provided is an ink jet ink including at least a pigment and a star polymer having a structure represented by at least one formula selected from the group consisting of the following general formulae (1) to (3).

$R_1-(S-R_1')_{n1}$        General formula (1)

$R_2-(X-S-R_2')_{n2}$        General formula (2)

$R_3-(O-X-S-R_3')_{n3}$        General formula (3)

14 Claims, 2 Drawing Sheets

INK JET INK, INK JET RECORDING METHOD, AND INK CARTRIDGE

BACKGROUND OF THE INVENTION

1. Field of the Invention

The present invention relates to an ink jet ink, an ink jet recording method, and an ink cartridge.

2. Description of the Related Art

In conventional cases, a dye that can be dissolved in an aqueous medium in ink for use in ink jet recording has been mainly used as a coloring material in the ink; in recent years, investigations on the use of a pigment have been underway from the viewpoints of, for example, the light fastness and water resistance of an image. Further, investigations have been underway on the use of various polymers as a dispersant for dispersing a pigment and an additive for improving scratch resistance or marker resistance.

In each of Japanese Patent Application Laid-Open No. 2000-169771 and Japanese Patent Application Laid-Open No. 2001-40256, there is proposed an ink jet ink containing a polymer having a star structure (star polymer).

However, an ink jet ink which uses a star polymer as a dispersion polymer for a pigment to provide an image having high colorability and excellent bleeding resistance and which can maintain such excellent characteristics even after long-term storage has been heretofore absent.

An ink using a star polymer specifically described in Japanese Patent Application Laid-Open No. 2000-169771 has been unable to provide sufficient optical density and sufficient character quality. In addition, from the star polymer described in Japanese Patent Application Laid-Open No. 2000-169771, a central compound cannot be obtained by isolating a central skeleton and the star polymer has no copolymer chain of a structure necessary for turning the polymer into a dispersion polymer. Further, reactive functional groups are crosslinked upon synthesis of the star polymer, so the central skeleton of the star polymer becomes bulky. As a result, the adsorption of the polymer to the surface of a pigment is hardly performed upon dispersion of the pigment. In addition, in the synthesis method described in Japanese Patent Application Laid-Open No. 2000-169771, the number of copolymer chains of which one molecule of the star polymer is formed cannot be controlled so that the star polymer has desired characteristics. Therefore, the molecular weight distribution of the polymer becomes broad. Of the star polymers synthesized as described above, a polymer which has a low molecular weight acts as a penetrating agent for ink on a recording medium, and high optical density is hard to obtain. In addition, a high-molecular-weight polymer out of such polymers adsorbs to the pigment, but a steric hindrance repulsive force acts between the molecules of the polymer, and the repulsive force may lead to a reduction in aggregating performance of the pigment. Accordingly, there still exists a problem to be solved in order that the star polymer may be used as a dispersion polymer.

An ink using a star polymer specifically described in Japanese Patent Application Laid-Open No. 2001-40256 has been unable to provide sufficient optical density and sufficient character quality. Further, in the invention described in Japanese Patent Application Laid-Open No. 2001-40256, the star polymer is not used as a dispersion polymer, and the main purpose of the invention is to improve the fixing performance (scratch resistance or marker resistance) of the ink through the addition of the star polymer. In other words, the star polymer described in Japanese Patent Application Laid-Open No. 2001-40256 does not function as a dispersion polymer for a pigment either.

Therefore, an object of the present invention is to provide an ink jet ink being capable of achieving both high colorability and excellent bleeding resistance of an image and having excellent storage stability. Another object of the present invention is to provide an ink jet recording method and an ink cartridge each using the ink jet ink.

SUMMARY OF THE INVENTION

The above object can be achieved by the following present invention. That is, the present invention provides an ink jet ink, including at least: a pigment; and a star polymer having a structure represented by at least one formula selected from the group consisting of the following general formulae (1) to (3):

  General formula (1)

  General formula (2)

  General formula (3)

where $R_1$ to $R_3$ each represent a trifunctional or higher functional organic residue containing no ester bond, X represents an alkylene group which may have a substituent, $R_1'$ to $R_3'$ each represent a copolymer chain of at least one monomer selected from the group consisting of aromatic (meth)acrylates and aromatic (meth)acrylamides and at least one monomer selected from the group consisting of acid monomers and salts of the acid monomers, and $n_1$ to $n_3$ each represent an integer of 3 or more.

In addition, the present invention provides an ink jet recording method including ejecting ink according to an ink jet system to perform recording on a recording medium, in which the ink used in the ink jet recording method is the ink jet ink of the present invention.

In addition, the present invention provides an ink cartridge including an ink storage portion for storing ink, in which the ink stored in the ink storage portion is the ink jet ink of the present invention.

According to one aspect of the present invention, there can be provided an ink jet ink being capable of achieving both high colorability and excellent bleeding resistance of an image and having excellent storage stability. According to another aspect of the present invention, there can be provided an ink jet recording method and an ink cartridge each using the ink jet ink.

Further features of the present invention will become apparent from the following description of exemplary embodiments with reference to the attached drawings.

DESCRIPTION OF THE EMBODIMENTS

Figure 1:
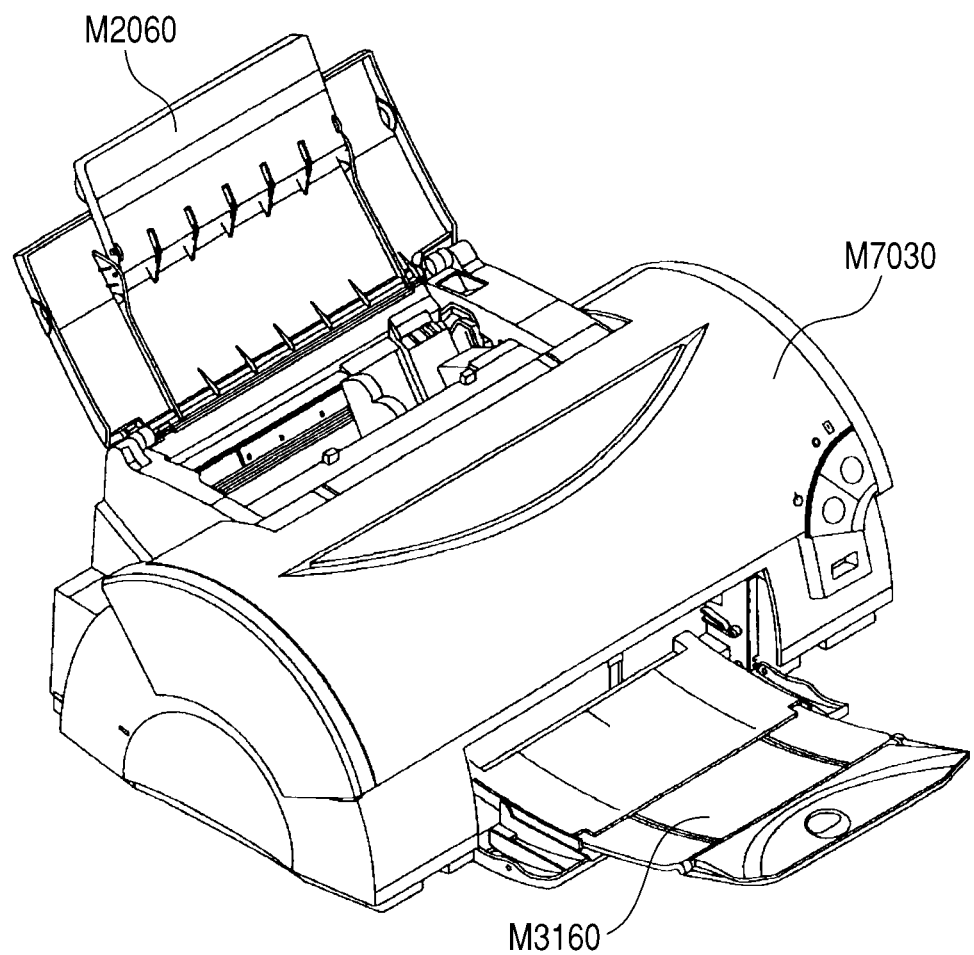
FIG. 1 is a perspective view of an ink jet recording apparatus.

Hereinafter, the present invention is described in more detail by way of a preferred embodiment. It should be noted that an ink jet ink may be simply referred to as "ink" in the following description. In addition, when a compound is a salt, the compound may dissociate in an aqueous medium to exist in the form of an ion; this case is also included in the expression "contains a salt" for convenience in the present invention.

Described below is the reason why the inventors of the present invention have conducted investigations on the above problems of the prior art to reach the present invention. First, as described above, a problem in a linear dispersion polymer is as follows: a trade-off develops between the stability of the adsorption of the dispersion polymer to a pigment and the aggregating performance of the pigment on a recording medium depending on the molecular weight of the dispersion polymer. That is, as the molecular weight reduces, the number of points at which the dispersion polymer adsorbs to the pigment reduces, so an ability to stabilize the adsorption of the dispersion polymer is impaired. On the other hand, as the molecular weight increases, the molecular size (hydrodynamic radius or radius of inertia) of the polymer increases. In addition, molecules of the polymer having a large molecular weight serve as a steric hindrance repulsive force between pigment particles, so the aggregating performance of pigment particles on the recording medium is inhibited. Accordingly, it has been extremely difficult to find out the molecular weight at which those two characteristics can be achieved. In view of the foregoing, the inventors have conducted investigations with a view to overcoming the trade-off. As a result, the inventors have drawn the following conclusion.

The phenomenon in which a polymer adsorbs to an interface has been described in a document (Polymers at interfaces, G. J. Fleer et al., Springer, 1993). A state where the polymer adsorbs to the interface such as a pigment surface means that the polymer contacts the interface to be bound by the interface. Therefore, in order that the stability of the adsorption of the polymer to a pigment may be improved, the probability that the polymer contacts the pigment surface (interface) needs to be increased, and at the same time, an entropy change at a time point when the polymer adsorbs to (is bound by) the pigment surface needs to be reduced.

In view of the foregoing, the inventors of the present invention have thought as described below. First, it is necessary only that the polymer is capable of moving around freely in an aqueous medium in order that the probability that the polymer contacts the pigment surface is increased. Accordingly, a reduction in molecular weight of the polymer or an increase in the number of hydrophilic terminals of the polymer is advantageous for the increase. In addition, the following state is advantageous for the reduction in entropy change upon adsorption of the polymer to the pigment surface: the polymer is of such a structure that a large number of bonds are present in its chain. Meanwhile, a state where the polymer has a large molecular weight is advantageous for preventing the polymer that has once adsorbed to the pigment surface from desorbing again because the stability of the adsorption improves as the number of adsorption points at which the chain of the polymer adsorbs increases. In view of the foregoing, the inventors have thought that a trade-off relationship develops between the increase of the probability that the polymer adsorbs to the pigment and an improvement in stability of the adsorption depending on the molecular weight of the polymer. In addition, the inventors have thought that a polymer of such a structure as to have a large number of terminals, i.e., branch points, is advantageous for the stabilization of the adsorption.

In addition, the molecular size of a star polymer can be reduced as compared to that of a linear polymer when number of copolymerized monomers is equal. Accordingly, the inventors of the present invention have thought that the steric hindrance repulsive force of the star polymer can be made relatively small, and hence, the extent to which the aggregation of the particles of the pigment on a recording medium is inhibited can be reduced. Further, as described above, when the central skeleton of the star polymer formed of copolymer chains adsorbs to the pigment surface, the distance to which the steric hindrance repulsive force extends from the surface of each particle of the polymer may substantially depend on the molecular weight (molecular size) of each arm (copolymer chain). Further, the reduction of an inhibiting action on the aggregation exerted by the steric hindrance repulsive force can be expected.

In addition, the star polymer used in the present invention is of such a structure that multiple copolymer chains are bonded to its central skeleton, and the use of a polyvalent thiol compound as a central compound can provide the polymer with a form in which each copolymer chain to serve as an arm extends from the central skeleton. In addition, as a result, a star polymer in which the number of arms is controlled can be easily obtained through a one-stage polymerization reaction. Further, the star polymer used in the present invention is characterized in that the polymer is obtained by introducing a thiol through a bonding with excellent hydrolysis resistance as the central skeleton. To be specific, the central skeleton of the star polymer of the present invention is free of any ester bond. Because the pH of an aqueous ink jet ink is often adjusted to fall within an alkaline region, it can be said that a hydrolysis reaction is apt to occur. However, when the central skeleton of the star polymer used as a dispersion polymer is structured so that a hydrolysis reaction hardly occurs, that is, structured so as to be free of any ester bond, the ink can show such characteristics that even in the case where the ink is stored for a long time period, the occurrence of a hydrolysis reaction is suppressed, and the ink is excellent in storage stability.

In addition to the above constitution, the copolymer chains in the star polymer used in the present invention are copolymer chains of an aromatic (meth)acrylate or an aromatic (meth)acrylamide and an acid monomer or a salt thereof. As a result, significant effects of the present invention, i.e., extremely excellent colorability and extremely excellent bleeding resistance have been obtained. Although the reason for the foregoing is unclear, the constitution of each of the basic skeleton and central skeleton of the above star polymer, and the constitution of each copolymer chain are assumed to act synergistically.

<Ink Jet Ink>

(Polymer Having Star Structure (Star Polymer))

An ink of the present invention is an ink containing: a star polymer in which at least three specific copolymer chains are bonded to a central skeleton; and a pigment. The star polymer has such a star structure that a copolymer chain obtained by copolymerizing an aromatic (meth)acrylate or an aromatic (meth)acrylamide and an acid monomer or a salt thereof is bonded to the central skeleton.

The term "star structure" as used in the present invention refers to a structure having a center and three or more lines radially extending from the center toward the outside. Thus, the term "star polymer (polymer having a star structure)" as used in the present invention refers to a polymer having a central skeleton and three or more copolymer chains radially extending from the central skeleton toward the outside.

In addition, the star polymer needs to be obtained by bonding the three or more copolymer chains to the central skeleton. It should be noted that the "central skeleton" of the star polymer of the present invention means the structure of a part excluding the copolymer chains of which the star polymer is formed. In addition, the central skeleton itself of the star polymer of the present invention can be isolated. The compound obtained by the isolation has the central skeleton; in the present invention, the compound having the central skeleton is referred to as "central compound". In addition, the star polymer of the present invention, when used as a dispersion polymer for a pigment, can best exert the effect of achieving both high colorability and bleeding resistance and an improvement in storage stability of the ink when the prepared ink is used to record an image.

The improvement in storage stability of the ink of the present invention is attributable mainly to the suppression of the occurrence of a hydrolysis reaction in the polymer. Accordingly, the star polymer used needs to be obtained by bonding the central compound and each copolymer chain in such a manner that the polymer hardly undergoes a hydrolysis reaction. To be specific, a polymer having a structure represented by any one of the following general formulae (1) to (3) is used.

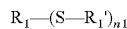   General formula (1)

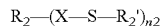   General formula (2)

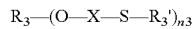   General formula (3)

It should be noted that, in the above formulae, $R_1$ to $R_3$ represent trifunctional or higher functional organic residues each of which contains no ester bond, the organic residues being identical to or different from one another, X represents an alkylene group which may have a substituent, $R_1'$ to $R_3'$ each represent a copolymer chain of an aromatic (meth)acrylate or an aromatic (meth)acrylamide and an acid monomer or a salt thereof, and $n_1$ to $n_3$ each represent an integer of 3 or more. It should be noted that the alkylene group may be linear or branched, and has preferably 3 to 8, or particularly preferably 3 to 5 carbon atoms. Of course, the above formulae (1), (2), and (3) are different from one another. Accordingly, $R_1$ in the general formula (1) has neither X nor O—X at the bonding site with $(S-R_1')_{n1}$, and $R_2$ in the general formula (2) does not have O—X at the bonding site with $(X-S-R_2')_{n2}$.

In the case of the polymer represented by the above formula (1), a structure obtained by removing all $R_1'$'s in the formula (1) is the central skeleton. Similarly, a structure obtained by removing all $R_2'$'s in the formula (2) is the central skeleton in the formula (2), and a structure obtained by removing all $R_3'$'s in the formula (3) is the central skeleton in the formula (3).

As described above, the copolymer chains represented by $R_1'$ to $R_3'$ are each obtained by copolymerizing at least one monomer selected from aromatic (meth)acrylates and aromatic (meth)acrylamides and an acid monomer or a salt thereof. As the at least one monomer selected from aromatic (meth)acrylates and aromatic (meth)acrylamides, specific examples thereof include: benzyl (meth)acrylate; 2-phenoxyethyl (meth)acrylate; 2-hydroxy-3-phenoxy (meth)acrylate; and esterfied compounds of α,β-ethylenically unsaturated carboxylic acid with a substituted aromatic alcohol and amide compounds of α,β-ethylenically unsaturated carboxylic acid with a substituted aromatic amine, such as 2-(meth)acryloyloxyethyl phthalate and benzyl (meth)acrylamide. Of those, in terms of improving dispersion stability, benzyl (meth)acrylate is preferably used. It should be noted that, in the present invention, "(meth)acrylate" means both "acrylate" and "methacrylate", and "(meth)acryloxy" means both "acryloxy" and "methacryloxy".

As the at least one monomer selected from an acid monomer and a salt thereof constituting the copolymer chains represented by $R_1'$ to $R_3'$, specific examples thereof include vinyl compounds and salts thereof having an acid group such as (meth)acrylic acid, maleic acid, maleic acid derivatives, itaconic acid, itaconic acid derivatives, fumaric acid, fumaric acid derivatives, vinyl sulfonic acid, and vinyl phosphonic acid. Examples of the salts thereof include potassium salts, sodium salts, lithium salts, and ammonium salts of the above monomers, and quaternary ammonium salts of the various organic amines. As the at least one monomer selected from the acid monomer and the salts thereof, because the water solubility of the star polymer becomes high as a result of copolymerization, a monomer having a carboxyl group or salts thereof are preferred, and (meth)acrylic acid or salts thereof are preferred, and as the salts, potassium salts and sodium salts are preferred. Further, an α,β-ethylenically unsaturated carboxylate such as methyl (meth)acrylate, ethyl (meth)acrylate, or butyl (meth)acrylate is used for copolymerization, followed by hydrolyzing the ester bond, and the resultant can be used as a (meth)acrylic acid or salts thereof.

It should be noted that a monomer except those listed above can be used in combination with the monomers of which the copolymer chains of the star polymer used in the present invention are formed to such an extent that the achievement of the objects of the present invention is not inhibited. Specific examples of the monomers include: (meth)acrylates such as methyl (meth)acrylate, ethyl (meth)acrylate, butyl (meth) acrylate, methoxyethyl (meth)acrylate, ethoxyethyl (meth) acrylate, hydroxyethyl (meth)acrylate, diethyleneglycol (meth)acrylate; triethyleneglycol (meth)acrylate, tetraethyleneglycol (meth)acrylate, polyethyleneglycol (meth)acrylate, methoxydiethyleneglycol (meth)acrylate, methoxytriethyleneglycol (meth)acrylate; methoxytetraethyleneglycol (meth)acrylate, methoxypolyethyleneglycol (meth)acrylate, cyclohexyl (meth)acrylate; isobornyl (meth)acrylate; and N,N-dimethylaminopropyl (meth)acrylate; (meth)acrylamides such as (meth)acrylamide, morpholine (meth)acrylamide, N-methylol (meth)acrylamide, and N-isopropyl (meth) acrylamide; and vinyl compounds such as N-vinylacetamide, N-vinylformamide, N-vinylpyridine, N-vinylpyrrolidone, and N-vinylcarbazole.

The star polymer is synthesized by bonding copolymer chains each obtained by copolymerizing such monomers as listed above to the central compound. A method of synthesizing the star polymer is, for example, a method involving the use of a polyvalent mercapto compound as a chain transfer agent described in Japanese Patent Application Laid-Open No. H07-179538. In this case, the star polymer is of the following structure: the polyvalent mercapto compound serving as the chain transfer agent is the central compound, a portion obtained by removing hydrogen atoms from the mercapto groups of the polyvalent mercapto compound as a sulfur-containing compound serving as the chain transfer agent is the central skeleton, and a copolymer chain of α,β-ethylenically unsaturated monomers extends from each sulfur atom of the portion.

To be specific, the star polymer represented by any one of the general formulae (1) to (3) can be synthesized by utilizing a polyvalent mercapto compound represented by any one of the following general formulae (a), (b), and (c) respectively corresponding to the star polymer represented by the general formulae (1) to (3) as the central compound (chain transfer agent): (a) $R_1$—$(SH)_{n1}$, (b) $R_2$—$(X-SH)_{n2}$, and (c) $R_3$—$(O-X-SH)_{n3}$. In the present invention, the compound represented by the above general formula (b) or (c) is preferably used as the central compound, and further, the compound represented by the above general formula (c) is particularly preferably used as the central compound. It should be noted that, when the compound represented by the above general formula (a) is utilized as the central compound of the star polymer, a portion obtained by removing all hydrogen atoms in the parentheses of the general formula (a) is the central skeleton of the star polymer to be obtained.

In addition, $R_1$ to $R_3$ and $n_1$ to $n_3$ in the general formulae (a) to (c) each have the same meaning as that in any one of the general formulae (1) to (3). To be specific, $R_1$ to $R_3$ represent trifunctional or higher functional organic residues each of which contains no ester bond, the organic residues being identical to or different from one another, and $n_1$ to $n_3$ each represent an integer of 3 or more.

$R_1$ to $R_3$ in the compounds represented by the above general formulae (a) to (c) represent trifunctional or higher functional organic residues each of which contains no ester bond, the organic residues being identical to or different from one another. In addition, the organic residue represented by $R_2$ has a structure into which a mercapto group is introduced through an alkylene group which may have a substituent. Further, the organic residue represented by $R_3$ has a structure into which a mercapto group is introduced through an ether bond and an alkylene group which may have a substituent. An ink in which a pigment is dispersed with the star polymer utilizing any one of such compounds can maintain its initial performance even after long-term storage because each of those structures has hydrolysis resistance. However, in the case of the structure represented by the general formula (a) or (b), hydrophobic structures are congested at the center of the star polymer. Accordingly, when such ink is used as an aqueous ink, the star polymer takes such a form that they aggregate within their molecule, so the adsorbing performance of the polymer to the pigment deteriorates slightly. In contrast, in the case of the structure represented by the general formula (c), an ether bond is present between the organic residue and the alkylene group, so the hydrophilicity of the central portion of the star polymer may improve, and the adsorption of the polymer to the pigment may be additionally good. Those polyvalent mercapto compounds can each be synthesized by the following approach. Of course, the present invention is not limited to the following synthesis method. It should be noted that, when the star polymer of the present invention is synthesized by using a polyvalent mercapto compound, $R_1$ to $R_3$ in the general formulae (1) to (3) each represent a residue of the polyvalent mercapto compound (sulfur-containing organic compound).

(1) Synthesis of Compound ($R_1$—$(SH)_{n1}$) Represented by General Formula (a)

A method of synthesizing the above central compound (polyvalent mercapto compound) is, for example, a method involving the use of an alkali and hydrogen sulfide for a polyvalent halogen compound described in Japanese Patent Application Laid-Open No. 07-206809. For example, a polyvalent halogen compound such as 1,1,1-trichloroethane, 1,2,3-trichloropropane, 1,1,2-tribromoethane, 1,2,3-tribromopropane, 1,1,2,2-tetrachloroethane, 1,2,5,6,9,10-hexabromocyclododecane, or 1,2,3,4,5,6-hexachlorocyclohexane is used as a starting material, and each halogen in the polyvalent halogen compound is substituted with a mercapto group by hydrogen sulfide, so a polyvalent mercapto compound having the corresponding valence can be obtained. $R_1$ in the polyvalent mercapto compound represented by the general formula (a) thus obtained has a structure obtained by removing halogens from the polyvalent halogen compound as the starting material.

(2) Synthesis of Compound ($R_2$—$(X$—$SH)_{n2}$) Represented by General Formula (b)

A method of synthesizing the above central compound (polyvalent mercapto compound) is, for example, a method involving dehydrating a polyvalent alcohol with concentrated sulfuric acid to turn the alcohol into an olefin and adding hydrogen sulfide to the olefin described in Japanese Patent Application Laid-Open No. 2005-213679. For example, a polyvalent alcohol such as trimethylolpropane, pentaerythritol, dipentaerythritol, or tripentaerythritol is used as a starting material, so a polyvalent mercapto compound having the corresponding valence can be obtained. Alternatively, a method involving adding hydrogen sulfide to a polyvalent epoxy compound described in Japanese Patent Application Laid-Open No. 11-209459 can also be employed. For example, a polyvalent epoxy compound such as 4,4'-methylenebis(N,N-diglycidylaniline) is used as a starting material, so a corresponding polyvalent mercapto compound can be obtained.

(3) Synthesis of Compound ($R_3$—$(O$—$X$—$SH)_{n3}$) Represented by General Formula (c)

A method of synthesizing the above central compound (polyvalent mercapto compound) is, for example, a method involving turning a polyvalent alcohol compound into a polyvalent allyl compound with an alkali and allyl chloride and adding hydrogen sulfide to the olefin as in the case of the above section (2) described in Japanese Patent Application Laid-Open No. 2005-213679. For example, a polyvalent alcohol compound such as glycerin, trimethylolpropane, pentaerythritol, dipentaerythritol, tripentaerythritol, cyclitol, inositol, D-arabitol, xylitol, adonitol, dulcitol, L-iditol, D-mannitol, D-sorbitol, or a Polyglycerin #310, #500, or #750 (product name; manufactured by SAKAMOTO YAKUHIN KOGYO CO., LTD.) as a glycerin condensate is used as a starting material, so a corresponding polyvalent mercapto compound can be obtained. Alternatively, as in the case of the above section (2), the compound can be obtained by a method involving adding hydrogen sulfide to a polyvalent epoxy compound as well. For example, a glycidyl ether of a polyvalent alcohol such as a Denacol EX-411, EX-421, EX-512, EX-521, EX-611, EX-612, EX-614B, or EX-622 (product name: manufactured by Nagase ChemteX Corporation) is used as a starting material, so a corresponding polyvalent mercapto compound can be obtained.

The organic residues represented by $R_1$ to $R_3$ of the present invention have structures obtained by removing (SH), (X—SH), and (O—X—SH) from the compounds represented by the above general formulae (a), (b), and (c), respectively. Accordingly, the structure of each organic residue of the present invention can be controlled depending on the structure of a polyvalent alcohol or polyvalent halogen compound as a starting material for obtaining a compound represented by the general formula (a), (b), or (c).

The use of the above polyvalent mercapto compound as a chain transfer agent in free radical polymerization enables one-stage synthesis of the star polymer. In addition, such use is suitable in that limitations on monomers that can be used in the copolymer chains of the star polymer are small.

In the star polymer used in the present invention, the number-average molecular weight (Mn) in terms of polystyrene obtained by gel permeation chromatography (GPC) is preferably 1,000 or more and 10,000 or less. When the number-average molecular weight is less than 1,000, the adsorbing performance of the star polymer to the pigment may reduce in some cases. On the other hand, when the above molecular weight exceeds 10,000, the steric hindrance repulsive force of the star polymer increases, so the aggregating performance of the pigment on a recording medium reduces, and hence, the ink may be unable to obtain a sufficient effect of improving colorability.

In addition, the molecular weight distribution of the star polymer as well as the number-average molecular weight of the star polymer can be obtained by gel permeation chromatography (GPC) in terms of polystyrene of the star polymer. The molecular weight distribution of the star polymer obtained by GPC is the ratio of the weight-average molecular weight Mw of the polymer in terms of polystyrene to the number-average molecular weight Mn in terms of polystyrene. The ratio preferably satisfies the relationship of $1.0 \leq (Mw/Mn) \leq 1.5$. In principle, the molecular weight distribution Mw/Mn does not become lower than 1.0. However, when the molecular weight distribution exceeds 1.5, the molecular weight distribution widens, so there is an increased possibility that a low-molecular-weight molecule having a weak adsorbing force to the pigment and a high-molecular-weight molecule that increases the steric hindrance repulsive force of the pigment are simultaneously present. Accordingly, the polymer may be unable to obtain a sufficient improving effect on the colorability or bleeding resistance of the ink on plain paper.

In addition, the copolymer chains of the star polymer (hereinafter, a copolymer chain in the star polymer may also be referred to as an "arm") each preferably have a number-average molecular weight of 400 or more and 3,000 or less. When the above molecular weight is less than 400, the adsorbing performance of the polymer to the pigment reduces, so the amount of the polymer that does not adsorb to the pigment may increase in the ink. As a result, an improving effect of the star polymer on the bleeding resistance of an image formed with the ink cannot be sufficiently obtained in some cases. In addition, when the above molecular weight exceeds 3,000, the steric hindrance repulsive force of the star polymer adsorbing to the pigment increases, so the aggregating performance of the pigment on a recording medium reduces. As a result, an improving effect of the star polymer on the colorability of the ink on plain paper cannot be sufficiently obtained in some cases.

As is apparent from the condition that $n_1$ to $n_3$ in the above general formulae (1) to (3) each represent 3 or more, the star polymer of the present invention needs to contain three or more copolymer chains. In addition, the number of copolymer chains is preferably eight or less, or more preferably three or more and eight or less. In other words, $n_1$ to $n_3$ in the general formulae (1) to (3) each preferably represent 3 or more and 8 or less. When more than eight copolymer chains (arms) are bonded, the steric hindrance repulsive force of the pigment increases, so the aggregating performance of the pigment on a recording medium reduces. As a result, the polymer may be unable to obtain a sufficient improving effect on the colorability of the ink on plain paper.

The star polymer used in the present invention contains at least one monomer unit selected from aromatic (meth)acrylates and aromatic (meth)acrylamides. The mass fraction of the monomer unit in the star polymer is preferably 30.0 mass % or more and 85.0 mass % or less with reference to the total mass of the star polymer. When the mass fraction is less than 30.0 mass %, the adsorbing force of the star polymer to the surface of the pigment is insufficient, so the storage stability of the pigment ink cannot be sufficiently obtained in some cases. On the other hand, when the mass fraction exceeds 85.0 mass %, the water solubility of the star polymer reduces, so the dispersion stability of the pigment cannot be sufficiently obtained in some cases.

The star polymer used in the present invention contains at least a unit derived from an acid monomer or a salt thereof. The fraction of the unit derived from an acid monomer or a salt thereof in the star polymer can be represented in terms of the acid value of the star polymer. In the present invention, the star polymer has an acid value of preferably 30 mgKOH/g or more and 250 mgKOH/g or less, or more preferably 50 mgKOH/g or more and 150 mgKOH/g or less. When the acid value falls short of the preferred range of the acid value, the dispersion stability of the pigment and the ejection stability of the ink cannot be sufficiently obtained in some cases. In addition, when the acid value exceeds the range, the adsorbing force of the star polymer to the surface of the pigment may reduce, and further, the ink cannot obtain sufficient colorability or sufficient bleeding resistance on plain paper owing to a reduction in aggregating performance of the pigment in some cases.

The mass fraction of the sum of the monomer unit selected from the aromatic (meth)acrylates and the aromatic (meth)acrylamides and the unit selected from the acid monomers and the salts thereof in the star polymer used in the present invention is preferably set as described below. That is, the sum of the monomer unit and the acid monomer or the salt thereof described above preferably accounts for 40.0 mass % or more and 100.0 mass % or less with reference to the total mass of the arms in the star polymer. When the mass fraction falls within the above range, a particularly suitable balance between each of the dispersion stability of the pigment and the ejection stability of the ink, and the colorability or bleeding resistance of the ink on plain paper can be achieved.

The pH of the ink of the present invention is preferably adjusted to fall within a neutral to alkaline range in order that the dispersion of the pigment can be stabilized with an electrostatic repulsive force of an anion produced by neutralizing an acidic group in the star polymer as described above. In this case, however, the ink may be responsible for the corrosion of various members used in an ink jet recording apparatus, so the pH is preferably adjusted to fall within the range of 7 to 10. A pH adjustor used in this case is, for example, any one of the following substances: various organic amines such as diethanolamine and triethanolamine; inorganic alkaline agents such as hydroxides of alkali metals including sodium hydroxide, lithium hydroxide, and potassium hydroxide; organic acids; and mineral acids. Such a star polymer as described above is dispersed or dissolved in an aqueous medium.

The content (mass %) of the star polymer in the ink is preferably 0.1 mass % or more and 15.0 mass % or less with reference to the total mass of the ink. In particular, when the star polymer is used as a dispersion polymer for the pigment, the content (mass %) of the star polymer in the ink is preferably 0.1 mass % or more and 5.0 mass % or less with reference to the total mass of the ink. It should be noted that a natural resin such as rosin, shellac, or starch, or a synthetic resin except the star polymer can be used as another dispersion polymer in combination with the above dispersion polymer to such an extent that the achievement of the objects of the present invention is not inhibited. The content of the resin except the star polymer in that case is preferably at most about the content of the star polymer.

(Pigment)

A coloring material used in the ink of the present invention is pigment, and the pigment is particularly preferably dispersed in an aqueous medium with the star polymer described above. The content (mass %) of the pigment in ink is preferably 1.0 mass % or more and 20.0 mass % or less, or more preferably 2.0 mass % or more and 12.0 mass % or less with reference to the total mass of the ink. Carbon black or an organic pigment is preferably used as the pigment. One kind of a pigment may be used alone, or two or more kinds of pigments may be used in combination.

As the black pigment, it is preferred to use carbon black such as furnace black, lamp black, acetylene black, and channel black as the pigment. The carbon black preferably has characteristics including a primary particle diameter of 11 nm or more and 40 nm or less, a specific surface area by the BET method of 50 m²/g or more and 400 m²/g or less, a volatile content of 0.5 mass % or more and 10 mass % or less, and a pH value of 2 to 10. As the black pigment, commercially available products and the like can be used.

In addition, carbon black newly prepared for the present invention can also be used as the black pigment. Other than carbon black, a magnetic substance fine particle such as magnetite or ferrite, titanium black, or the like may also be used as the black pigment.

Any one of the known organic pigments can be used as the organic pigment without any particular limitation. To be specific, for example, organic pigments each represented by a color index (C.I.) number can be used.

(Aqueous Medium)

The ink of the present invention preferably contains an aqueous medium which is a mixed medium of water and a water-soluble organic solvent. Ion-exchanged water (deionized water) is preferably used as water instead of general water containing various ions. The water content (mass %) in the ink is preferably 10.0 mass % or more and 90.0 mass % or less, or more preferably 30.0 mass % or more and 80.0 mass % or less with reference to the total mass of the ink. In addition, the content (mass %) of the water-soluble organic solvent in the ink is preferably 3.0 mass % or more and 50.0 mass % or less, or more preferably 3.0 mass % or more and 40.0 mass % or less with reference to the total mass of the ink.

As the water-soluble organic solvent, there can be used a known water-soluble organic solvent that can be used for an ink jet ink.

(Other Components)

An additive such as a surfactant, a defoaming agent, or an antiseptic as well as the above components can be appropriately added as required to the ink of the present invention in order that the ink has desired physical property values. The content (mass %) of such an additive in the ink is preferably 0.05 mass % or more and 10.0 mass % or less, or more preferably 0.2 mass % or more and 5.0 mass % or less with reference to the total mass of the ink.

(Method of Preparing Ink)

A method of preparing the ink of the present invention formed of such components as described above can be such a method as described below. First, the pigment is added to a mixture obtained by mixing at least a star polymer and water, and the contents are mixed and stirred. After that, the mixture is subjected to a dispersion treatment with a dispersing unit, and is then subjected to a centrifugation treatment as required so that a pigment dispersion liquid can be obtained. Further, for example, the aqueous medium or any such an appropriately selected additive as listed above is added as required to the pigment dispersion liquid, and the mixture is stirred. Thus, the ink of the present invention is obtained.

It should be noted that the dispersion stability of the ink can be additionally improved by adding a base for dissolving the star polymer used in the present invention upon preparation of the pigment dispersion liquid. Examples of the base include: organic amines such as monoethanolamine, diethanolamine, triethanolamine, amine methyl propanol, and ammonia; and inorganic bases such as potassium hydroxide, sodium hydroxide, and lithium hydroxide.

As described above, the ink of the present invention is prepared by using the pigment dispersion liquid obtained through the dispersion treatment. Prior to the dispersion treatment performed upon preparation of the pigment dispersion liquid, performing a premixing operation in which the pigment is added to the mixture obtained by mixing at least the star polymer and water is effective. That is, such a premixing operation is preferred because the wettability of the surface of the pigment can be improved, and the adsorption of a dispersant to the surface of the pigment can be promoted.

Any dispersing machine as generally used can be used in the above-mentioned dispersing treatment of pigments. Examples of the dispersing machine include a ball mill, a roll mill, a sand mill, a beads mill, and an ultra-high pressure homogenizer. Of those, the beads mill and the ultra-high pressure homogenizer are preferably used. Specific examples of those dispersing machines include SUPER MILL, SUPER APEX MILL, NANOMISER, AGITATOR MILL, GLEN MILL, DYNO MILL, PEARL MILL, and COBOL MILL (all of which are trade names).

In order that the ink of the present invention is suitably usable in an ink jet recording method, a pigment having an optimum particle size distribution is preferably used from the viewpoint of, for example, the resistance of a recording head against clogging with the ink. A method of obtaining a pigment having a desired particle size distribution is, for example, any one of the following approaches: an approach involving reducing the size of the pulverization medium of any of such dispersing machines as listed above; an approach involving increasing the filling rate of the pulverization medium; an approach involving lengthening the treatment time; an approach involving performing classification with a filter, a centrifugal separator, or the like after pulverization; an approach involving increasing the number of times of treatment with an ultra-high pressure homogenizer or increasing the pressure at which the treatment is performed; and a combination of two or more of those approaches.

<Ink Set>

An ink set of the present invention is an ink set formed of multiple inks. The ink set is characterized in that the ink set is obtained by combining the ink (pigment ink) of the present invention containing at least the pigment and the star polymer described above, and an ink (dye ink) containing at least a dye. The ink set of such constitution can provide not only an effect obtained by the pigment ink but also an image excellent particularly in bleeding resistance between images formed with the multiple inks. The ink set of the present invention is particularly suitably for use in ink jet recording, in other words, an ink jet ink set. The ink set of the present invention may be further combined with an ink of any other constitution in addition to the pigment ink described above. Examples of such an ink include a pigment ink free of any star polymer and an ink containing both a dye and a pigment as coloring materials.

Any one of the components that can be incorporated into the ink of the present invention described above can be used as a component forming the dye ink of which the ink set is formed on condition that the dye is used as a coloring material. Any one of the conventionally known dyes can be used as the dye, and a pigment as well as the dye can be used.

In the present invention, each of the following cases where ink cartridges storing the respective inks are used in combination can also be given as an example of the ink set: the case where an ink cartridge integrally storing a cyan ink, a magenta ink, a yellow ink, and a black ink is used; and the case where an ink cartridge integrally storing a cyan ink, a magenta ink, and a yellow ink is used in combination with another ink cartridge storing a black ink. Further, specific examples of the case where multiple independent ink cartridges are used in combination in the ink set include: the case where independent ink cartridges each storing a cyan ink, a magenta ink, or a yellow ink are used in combination with another ink cartridge storing a black ink; the case where ink cartridges each storing a black ink, a pale cyan ink, or a pale magenta ink are used in combination; the case where a single ink cartridge storing a red ink is used in addition to the above ink cartridges; the case where a single ink cartridge storing a green ink is used in addition to the above ink cartridges; and the case where a single ink cartridge storing a blue ink is used in addition to the above ink cartridges. Of course, the present invention is not limited to those cases.

<Set of Ink and Reaction Liquid>

The ink of the present invention is preferably used in combination with a reaction liquid having the following action to serve as a set of the ink and the reaction liquid: upon contact with the ink on a recording medium, the reaction liquid increases the average particle size of the pigment in the ink, that is, destabilizes the dispersed state of the pigment in the ink. A recorded article having an additionally high image density or additionally high colorability can be obtained by performing recording with the set of the ink and the reaction liquid. Hereinafter, the reaction liquid used in the present invention is described.

(Reaction Agent)

A compound (reaction agent) used in the reaction liquid having an action of increasing the average particle size of the pigment in the ink, that is, destabilizing the dispersed state of the pigment in the ink is, for example, a polyvalent metal ion or a cationic polymer. Any such reaction agent reacts with the pigment in the ink to exert an action of increasing the average particle size of the pigment, that is, destabilizing the dispersed state of the pigment.

Specific examples of the polyvalent metal ion include: divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Fe^{3+}$, $Al^{3+}$, $Cr^{3+}$, and $Y^{3+}$. In order to incorporate the polyvalent metal ion into the reaction liquid, a polyvalent metal salt is used. The polyvalent metal salt refers to a salt formed of each of the polyvalent metal ions listed above and an anion bonded to the ion, which needs to be soluble in water. Examples of a preferable anion for forming a salt include $Cl^-$, $NO_3^-$, $I^-$, $Br^-$, $ClO_3^-$, $SO_4^{2-}$, $CO_3^{2-}$, $CH_3COO^-$, and $HCOO^-$. The content (mass %) of the polyvalent metal ion in the reaction liquid is preferably 0.01 mass % or more and 10.0 mass % or less with reference to the total mass of the reaction liquid.

Specific examples of the cationic polymer include polyallylamine, polyethyleneimine, an epichlorohydrin/dimethylamine polymer, polydimethyldiallylammonium chloride, a dicyandiamide/diethylenetriamineammonium chloride condensate, and a guanidinium formaldehyde condensate. The content (mass %) of cationic polymers in a reaction solution is preferably 0.01 mass % or more and 10.0 mass % or less with reference to the total mass of the reaction solution.

(Aqueous Medium)

The reaction liquid used in the present invention preferably contains an aqueous medium which is a mixed medium of water and a water-soluble organic solvent. Ion-exchanged water (deionized water) is preferably used as water instead of general water containing various ions. The water content (mass %) in the reaction liquid is preferably 25.0 mass % or more and 95.0 mass % or less with reference to the total mass of the reaction liquid. In addition, the content (mass %) of the water-soluble organic solvent in the reaction liquid is preferably 5.0 mass % or more and 60.0 mass % or less, or more preferably 5.0 mass % or more and 40.0 mass % or less with reference to the total mass of the reaction liquid. Any one of the solvents that can be incorporated into the ink described above can be used as the water-soluble organic solvent used in the reaction liquid.

(Other Components)

An additive such as a surfactant, a viscosity modifier, a pH adjustor, an antiseptic, or an antioxidant may be further appropriately blended as required into the reaction liquid used in the present invention. Selection and the addition amount of a surfactant functioning as a permeation promoter are preferably determined in such a proper manner that the permeability of the reaction liquid for a recording medium is suppressed. Further, the reaction liquid used in the present invention is more preferably colorless; the reaction liquid may be in such a pale color that the reaction liquid does not change the color tone of the ink upon contact and mixing with the ink on the recording medium. Further, the viscosity at 25° C. of the reaction liquid is preferably adjusted to fall within the range of 1 mPa·s or more to 30 mPa·s or less.

(Method of Applying Reaction Liquid)

A method of applying the reaction liquid used in the present invention to a recording medium is, for example, a method of using an ink jet recording system as in the case of the ink or a method of applying the reaction liquid to the recording medium with a roller or the like. In the present invention, the reaction liquid is particularly preferably applied so that at least a region where the ink is applied can be included on the recording medium. In addition, the order of application of the reaction liquid and the ink to the recording medium is arbitrary; the ink is particularly preferably applied after the reaction liquid has been applied in advance.

<Ink Jet Recording Method>

An ink jet recording method of the present invention includes ejecting ink according to an ink jet system to perform recording on a recording medium, and is characterized in that the ink used in the ink jet recording method is the ink of the present invention. Examples of the ink jet system used in the ink jet recording method of the present invention include a recording method involving applying mechanical energy to ink to eject the ink and a recording method involving applying thermal energy to ink to eject the ink. An ink jet recording method involving the utilization of thermal energy can be particularly preferably used in the present invention.

<Ink Jet Recording Apparatus>

An ink jet recording apparatus of the present invention includes an ink storage portion for storing ink and a recording head for ejecting the ink, and is characterized in that the ink stored in the ink storage portion is the ink of the present invention. An additionally significant effect can be obtained particularly when the ink jet recording apparatus is such that the recording head ejects the ink by applying thermal energy to the ink.

Hereinafter, the schematic constitution of the mechanism portion of the ink jet recording apparatus is described. FIG. 1 is a perspective view of an ink jet recording apparatus. The ink jet recording apparatus is formed of a sheet feeding portion, a conveying portion, a carriage portion, a sheet discharge portion, and a cleaning portion, and an external packaging portion M7030 for protecting them and providing them with design to achieve a role of each mechanism. The ink jet recording apparatus includes a sheet feeding tray M2060 constituting the sheet feeding portion and a sheet discharge tray M3160 constituting the sheet discharge portion. The sheet feeding portion, the conveying portion, the carriage portion, the sheet discharge portion, and the cleaning portion are not particularly limited and any usable one can be used.

<Constitution of Recording Head>

Figure 2:
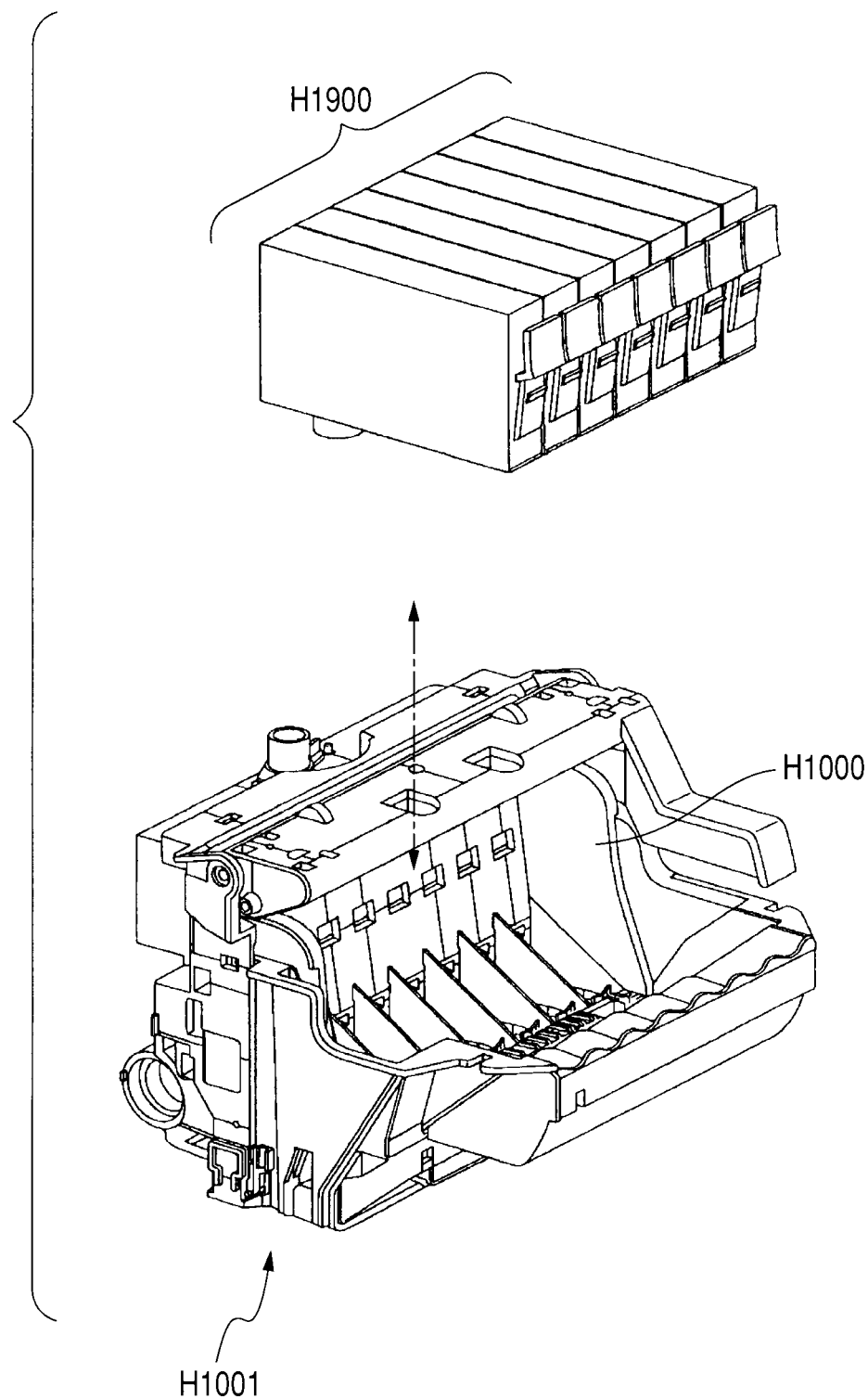
FIG. 2 is a perspective view illustrating a state where an ink cartridge is mounted on a head cartridge.

The constitution of a head cartridge H1000 is described (see FIG. 2). The head cartridge H1000 has the recording head H1001, a unit for mounting the ink cartridges H1900, and a unit for supplying ink from the ink cartridges H1900 to the recording head, and the head cartridge H1000 is attachably and detachably mounted on a carriage.

FIG. 2 is a view illustrating the manner in which the ink cartridges H1900 are mounted on the head cartridge H1000. The ink jet recording apparatus forms an image with, for example, seven kinds of inks. Therefore, the ink cartridges H1900 are also independently prepared for seven colors. In addition, as illustrated in FIG. 2, each ink cartridge is attachable to and detachable from the head cartridge H1000. It should be noted that the ink cartridges H1900 can be attached or detached in a state where the head cartridge H1000 is mounted on a carriage.

The ink jet recording apparatus is not limited to an apparatus in which a recording head and an ink cartridge are separated, and an apparatus in which the recording head and the ink cartridge are integrated so as to be unseparable may be used as the apparatus. Further, the ink cartridge may be separably or unseparably integrated with the recording head to be mounted on the carriage, or may be provided for a fixed site of the ink jet recording apparatus to supply ink to the recording head through an ink supply member such as a tube. In addition, when the ink cartridge is provided with a constitution for applying a preferable negative pressure to the recording head, for example, the following constitution can be adopted: an absorber is placed in an ink storage portion of the ink cartridge, or the ink cartridge has a flexible ink storage bag and a spring portion that applies, to the bag, a bias in the direction in which the internal volume of the bag is expanded. In addition, the ink jet recording apparatus may adopt such a serial recording mode as described above, or may be in the form of a line printer obtained by aligning recording elements over the range corresponding to the entire width of a recording medium.

EXAMPLES

Hereinafter, the present invention is described more specifically by way of examples and comparative examples. It should be noted that, in the following description, the terms "part(s)" and "%" mean "part(s) by mass" and "mass %", respectively unless otherwise stated.

The following abbreviations mean the respective compounds below.
MEK: methyl ethyl ketone
BzA: benzyl acrylate
nBA: n-butyl acrylate
AA: acrylic acid
BzAm: N-benzylacrylamide
P-1M: Light Ester P-1M (manufactured by KYOEISHA CHEMICAL Co., LTD.)
SA: NK Ester SA (manufactured by Shin-Nakamura Chemical Co., Ltd.)
St: styrene
2EHA: 2-ethylhexyl acrylate
HEA: 2-hydroxyethyl acrylate
nBMA: n-butyl methacrylate
tBMA: tert-butyl methacrylate
MAA: methacrylic acid
EGDMA: ethylene glycol dimethacrylate
BzMA: benzyl methacrylate
PEMP: pentaerythritol tetrakis(3-mercaptopropionate)
V-59: 2,2'-azobis(2-methylbutyronitrile (manufactured by Wako Pure Chemical Industries, Ltd.)
PEG 1,000: polyethylene glycol (average molecular weight 1,000)
AE 100: acetylene glycol ethylene oxide adducts (manufactured by Kawaken Fine Chemicals Co., Ltd.)
9-BNN: 9-borabicyclo[3,3,1]nonane <Synthesis of Central Compounds>

Synthesis Example 1

A thiol compound S1 was synthesized in accordance with Example 4 described in Japanese Patent Application Laid-Open No. 2005-213679. To be specific, 200 g of a solution of 29.6 g (0.1 mol) of pentaerythritol tetraallyl ether in methanol and 2.4 mg (0.02 mmol) of 9-BNN were put into an autoclave having a volume of 300 mL, and the air in the system was replaced with nitrogen. Then, 23.9 g (0.7 mol) of hydrogen sulfide was introduced into the system, and the resultant mixture was subjected to a reaction for 5 hours while the temperature in the system was kept at 20° C. After the reaction, the resultant was concentrated under reduced pressure. As a result, the following tetrafunctional thiol compound S1 was obtained.

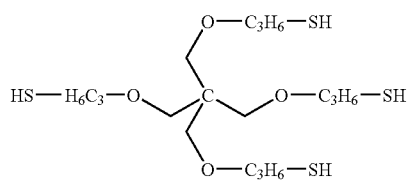

Synthesis Example 2

A thiol compound S2 was synthesized in accordance with Example 1 described in Japanese Patent Application Laid-Open No. 63-162640. To be specific, 18.0 g (0.1 mol) of inositol, 7.7 g of tetramethylammonium bromide, and 25.0 g (0.3 mol) of a 48% aqueous solution of sodium hydroxide were put into an autoclave having a volume of 300 mL, and the mixture was stirred at 90° C. for 1 hour. Then, 23.0 g (0.3 mol) of allyl chloride were introduced into the system, and the resultant mixture was subjected to a reaction for 4 hours while the temperature in the system was kept at 90° C. After that, 25.0 g of a 48% aqueous solution of sodium hydroxide were further added to the resultant, and the mixture was stirred for 1 hour. Then, 23.0 g of allyl chloride were introduced into the system, and the resultant mixture was subjected to a reaction for 4 hours. After the reaction, the organic component was extracted with hexane, and was then dried under reduced pressure. As a result, inositol hexaallyl ether was obtained. After that, the following hexafunctional thiol compound S2 was obtained in the same manner as in Synthesis Example 1 except that pentaerythritol tetraallyl ether in Synthesis Example 1 was changed to inositol hexaallyl ether.

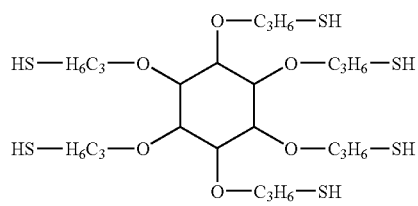

Synthesis Example 3

A thiol compound S3 was synthesized as described below. First, 100 g of toluene, 13.6 g (0.1 mol) of pentaerythritol, 10 g of dimethylformamide (DMF), and 119 g (1 mol) of thionyl chloride were put into a round-bottom flask, and then the flask was heated to 80° C. As a result, 2,2-di-(methylchloro)-1,3-dichloropropane (DMCDCM) was obtained. Ion-exchanged water was added to the reacted solution so that an unreacted product, DMF, and thionyl chloride were extracted with ion-exchanged water. Further, only the toluene phase was taken in the round-bottom flask with a separating funnel, and toluene was removed with an evaporator so that DMCDCM was purified. Subsequently, 28.9 g (0.1 mol) of DMCDCM was dissolved in 100 g of tetrahydrofuran at room temperature, and 7.6 g of thiourea was added to the solution. After the mixture had been stirred for 1 hour, 100 mL of a 1N aqueous solution of sodium hydroxide was added to the mixture. As a result, the following tetrafunctional thiol compound S3 was obtained.

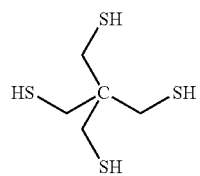

Synthesis Example 4

A reaction was performed along the same reaction path as that in the above method of synthesizing the thiol compound S3 after the purification of DMCDCM except that 29.1 g (0.1 mol) of 1,2,3,4,5,6-hexachlorocyclohexane was used instead of DMCDCM. As a result, the following hexafunctional thiol compound S4 was obtained.

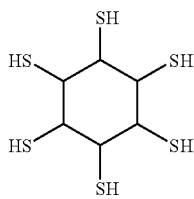

Synthesis Example 5

The following trifunctional thiol compound S5 was obtained in the same manner as in Synthesis Example 1 except that pentaerythritol tetraallyl ether in the method of synthesizing the thiol compound S1 was changed to pentaerythritol triallyl ether.

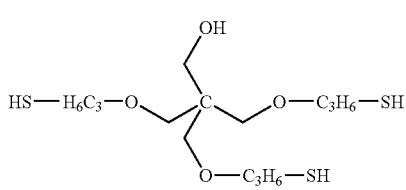

Synthesis Example 6

The following octafunctional thiol compound S6 was obtained in the same manner as in Synthesis Example 2 except that inositol in the method of synthesizing the thiol compound S2 was changed to tripentaerythritol.

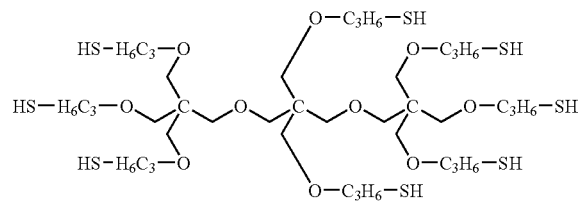

Synthesis Example 7

The following nonafunctional thiol compound S7 was obtained in the same manner as in Synthesis Example 2 except that inositol in the method of synthesizing the thiol compound S2 was changed to polyglycerin #500 (glycerin heptamer, manufactured by SAKAMOTO YAKUHIN KOGYO CO., LTD.).

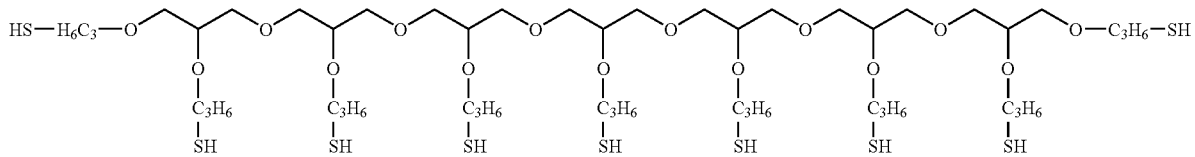

Synthesis Example 8

The following trifunctional thiol compound S8 was obtained in the same manner as in Synthesis Example 3 except that pentaerythritol in the method of synthesizing the thiol compound S3 was changed to trimethylolpropane.

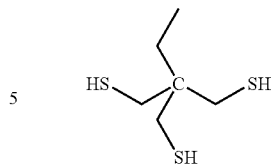

Synthesis Example 9

The following octafunctional thiol compound S9 was obtained in the same manner as in Synthesis Example 3 except that pentaerythritol in the method of synthesizing the thiol compound S3 was changed to tripentaerythritol.

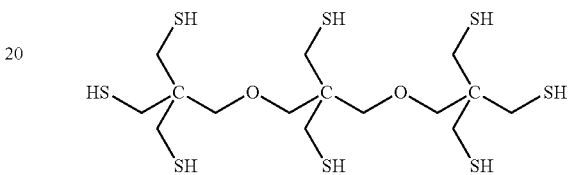

<Preparation of Polymer Aqueous Solutions>
(Polymers 1 to 5)

First, 90 parts of MEK were put into a flask provided with a stirring apparatus, a nitrogen-introducing tube, a reflux condenser, and a temperature gauge, and the temperature in the flask was increased to 80° C. under a nitrogen atmosphere. Next, a solution prepared by mixing 65 parts of BzA, 20 parts of nBA, 15 parts of AA, and 10 parts of the tetrafunctional thiol compound S1 as a central compound to serve as the central skeleton of a star polymer was dropped to the flask over 2 hours. At the same time, a polymerization initiator solution prepared by dissolving 0.3 part of V-59 in 10 parts of MEK was dropped to the flask over 3 hours. The dropping of the polymerization initiator solution was initiated at the same timing as that of the initiation of the dropping of the mixed solution containing the tetrafunctional thiol compound S1. In addition, after the completion of the dropping of the polymerization initiator solution (3 hours after the initiation of the dropping), the mixture was continuously subjected to a reaction for 2 hours.

The molecular weight of the polymer 1 thus obtained as a star polymer was measured with a gel permeation chromatograph provided with a differential refractometer (manufactured by TOSOH CORPORATION) by using polystyrene as a standard substance and tetrahydrofuran as a solvent. The polymer had a number-average molecular weight Mn of 4,000, a weight-average molecular weight Mw of 5,200, and a molecular weight distribution Mw/Mn of 1.30. It should be noted that the bonding of six arms to the central skeleton was identified by confirming the disappearance of the absorption of a thiol (S—H bond) (around 2,570 cm$^{-1}$) with a Raman spectrometer (manufactured by JASCO Corporation). The polymer 1 thus obtained had an acid value of 106 mgKOH/g. An equivalent amount of KOH with respect to the acid value of the polymer 1 and an appropriate amount of water were added to a solution of the polymer in MEK, and the mixture was stirred. After that, MEK was removed under a reduced pressure condition, water was added to the remainder. Thus, a 25% polymer aqueous solution 1 was obtained.

Polymers 2 to 4 having different central skeletons were each synthesized by the same method as the method of synthesizing the polymer 1 except that, while monomers identical in composition to those of the polymer 1 were used, the central compound and its proportion were changed. Table 1 below shows the respective physical properties of the polymers 1 to 4 collectively.

TABLE 1

|  | Polymer 1 | Polymer 2 | Polymer 3 | Polymer 4 |
|---|---|---|---|---|
| Thiol compound | S1: 10 parts | S2: 15 parts | S3: 6 parts | S4: 7 parts |
| Polymer structure | $R_3$—(O—X—S—$R_3'$)$_{n3}$ | $R_3$—(O—X—S—$R_3'$)$_{n3}$ | $R_2$—(X—S—$R_2'$)$_{n2}$ | $R_1$—(S—$R_1'$)$_{n1}$ |
| Number of arms | 4 | 6 | 4 | 6 |
| Number-average molecular weight (Mn) | 4,000 | 4,000 | 4,000 | 3,900 |
| Weight-average molecular weight (Mw) | 5,200 | 5,000 | 5,200 | 5,000 |
| Molecular weight distribution [Mw/Mn] | 1.30 | 1.25 | 1.30 | 1.28 |
| Acid value [mgKOH/g] | 106 | 102 | 110 | 109 |

(Polymers 5 and 6)

Polymers 5 and 6 having different number-average molecular weights were each synthesized by the same method as the method of synthesizing the polymer 1 except that, while monomers identical in composition to those of the polymer 1 and the same central compound as that in Polymer 1 were used, the proportion of the central compound was changed. Table 2 below shows the respective physical properties of the polymers 5 and 6 collectively.

TABLE 2

|  | Polymer 5 | Polymer 6 |
|---|---|---|
| Thiol compound | S1: 4.5 parts | S1: 4 parts |
| Polymer structure | $R_3$—(O—X—S—$R_3'$)$_{n3}$ | $R_3$—(O—X—S—$R_3'$)$_{n3}$ |
| Number of arms | 4 | 4 |
| Number-average molecular weight (Mn) | 10,000 | 11,000 |
| Weight-average molecular weight (Mw) | 13,000 | 15,000 |
| Molecular weight distribution [Mw/Mn] | 1.30 | 1.36 |
| Acid value [mgKOH/g] | 112 | 112 |

(Polymers 7 and 8)

Polymers 7 and 8 having different number-average molecular weights were each synthesized by the same method as the method of synthesizing the polymer 3 except that, while monomers identical in composition to those of the polymer 3 and the same central compound as that in polymer 3 were used, the proportion of the central compound was changed. Table 3 below shows the respective physical properties of the polymers 7 and 8 collectively.

TABLE 3

|  | Polymer 7 | Polymer 8 |
|---|---|---|
| Thiol compound | S3: 2.5 parts | S3: 2 parts |
| Polymer structure | $R_2$—(X—S—$R_2'$)$_{n2}$ | $R_2$—(X—S—$R_2'$)$_{n2}$ |
| Number of arms | 4 | 4 |
| Number-average molecular weight (Mn) | 10,000 | 11,000 |
| Weight-average molecular weight (Mw) | 13,000 | 15,000 |
| Molecular weight distribution [Mw/Mn] | 1.30 | 1.36 |
| Acid value [mgKOH/g] | 114 | 115 |

(Polymers 9 and 10)

Polymers 9 and 10 having different number-average molecular weights were each synthesized by the same method as the method of synthesizing the polymer 1 except that, while monomers identical in composition to those of the polymer 1 were used, the central compound and its proportion were changed. Table 4 below shows the respective physical properties of the polymers 9 and 10 collectively.

TABLE 4

|  | Polymer 9 | Polymer 10 |
|---|---|---|
| Thiol compound | S5: 35 parts | S5: 40 parts |
| Polymer structure | $R_3$—(O—X—S—$R_3'$)$_{n3}$ | $R_3$—(O—X—S—$R_3'$)$_{n3}$ |
| Number of arms | 3 | 3 |
| Number-average molecular weight (Mn) | 1,000 | 900 |
| Weight-average molecular weight (Mw) | 1,300 | 1,200 |
| Molecular weight distribution [Mw/Mn] | 1.30 | 1.33 |
| Acid value [mgKOH/g] | 87 | 84 |

(Polymers 11 and 12)

Polymers 11 and 12 having different number-average molecular weights were each synthesized by the same method as the method of synthesizing the polymer 3 except that, while monomers identical in composition to those of the polymer 3 were used, the central compound and its proportion were changed. Table 5 below shows the respective physical properties of the polymers 11 and 12 collectively.

TABLE 5

|  | Polymer 11 | Polymer 12 |
|---|---|---|
| Thiol compound | S8: 22 parts | S8: 25 parts |
| Polymer structure | $R_2$—(X—S—$R_2'$)$_{n2}$ | $R_2$—(X—S—$R_2'$)$_{n2}$ |
| Number of arms | 3 | 3 |
| Number-average molecular weight (Mn) | 1,000 | 900 |
| Weight-average molecular weight (Mw) | 1,300 | 1,200 |
| Molecular weight distribution [Mw/Mn] | 1.30 | 1.33 |
| Acid value [mgKOH/g] | 97 | 94 |

(Polymers 13 to 15)

Polymers 13 to 15 having different numbers of arms were each synthesized by the same method as the method of synthesizing the polymer 1 except that, while monomers identical in composition to those of the polymer 1 were used, the central compound and its proportion were changed. Table 6 below shows the respective physical properties of the polymers 13 to 15 collectively.

TABLE 6

|  | Polymer 13 | Polymer 14 | Polymer 15 |
|---|---|---|---|
| Thiol compound | S5: 8 parts | S6: 23 parts | S7: 28 parts |
| Polymer structure | $R_3$—(O—X—S—$R_3'$)$_{n3}$ | $R_3$—(O—X—S—$R_3'$)$_{n3}$ | $R_3$—(O—X—S—$R_3'$)$_{n3}$ |
| Number of arms | 3 | 8 | 9 |
| Number-average molecular weight (Mn) | 4,000 | 4,100 | 4,200 |
| Weight-average molecular weight (Mw) | 5,600 | 5,500 | 6,200 |
| Molecular weight distribution [Mw/Mn] | 1.40 | 1.34 | 1.48 |
| Acid value [mgKOH/g] | 108 | 95 | 91 |

(Polymers 16 and 17)

Polymers 16 and 17 having different numbers of arms were each synthesized by the same method as the method of synthesizing the polymer 3 except that, while monomers identical in composition to those of the polymer 3 were used, the central compound and its proportion were changed. Table 7 below shows the respective physical properties of the polymers 16 and 17 collectively.

TABLE 7

|  | Polymer 16 | Polymer 17 |
|---|---|---|
| Thiol compound | S8: 5.5 parts | S9: 14 parts |
| Polymer structure | $R_2$—(X—S—$R_2'$)$_{n2}$ | $R_2$—(X—S—$R_2'$)$_{n2}$ |
| Number of arms | 3 | 8 |
| Number-average molecular weight (Mn) | 4,100 | 4,200 |
| Weight-average molecular weight (Mw) | 5,600 | 5,600 |
| Molecular weight distribution [Mw/Mn] | 1.37 | 1.33 |
| Acid value [mgKOH/g] | 111 | 103 |

(Polymers 18 to 20)

Polymers 18 to 20 having different compositions were each synthesized by the same method as the method of synthesizing the polymer 1 except that, while the same central compound as that of the polymer 1 was used, monomers to be used were changed as shown in the following table. Table 8 below shows the respective physical properties of the polymers 18 to 20 collectively. It should be noted that Table 8 below shows the respective physical properties of the polymer 1 synthesized in the foregoing as well.

TABLE 8

|  | Polymer 1 | Polymer 18 | Polymer 19 | Polymer 20 |
|---|---|---|---|---|
| Monomers to be copolymerized | BzA/nBA/AA | BzAm/nBN/P-1M | BzAm/nBA/SA | BzAm/nBA/AA |
| Composition fraction (mass fraction) | 65/20/15 | 56/17/27 | 41/11/48 | 65/20/15 |
| Thiol compound | S1: 10 parts | S1: 10 parts | S1: 10 parts | S1: 10 parts |
| Polymer structure | $R_3$—(O—X—S—$R_3'$)$_{n3}$ | $R_3$—(O—X—S—$R_3'$)$_{n3}$ | $R_3$—(O—X—S—$R_3'$)$_{n3}$ | $R_3$—(O—X—S—$R_3'$)$_{n3}$ |
| Number of arms | 4 | 4 | 4 | 4 |
| Number-average molecular weight (Mn) | 4,000 | 4,000 | 4,100 | 4,300 |
| Weight-average molecular weight (Mw) | 5,200 | 5,600 | 5,700 | 6,400 |
| Molecular weight distribution [Mw/Mn] | 1.30 | 1.40 | 1.39 | 1.49 |
| Acid value [mgKOH/g] | 106 | 107 | 106 | 106 |

(Polymer 21)

Polymer 21 having a different composition was synthesized by the same method as the method of synthesizing the polymer 15 except that, while the same central compound as that of the polymer 15 was used, monomers to be used were changed as shown in the following table. Table 9 below shows the respective physical properties of the polymer 21 collectively.

TABLE 9

|  | Polymer 15 | Polymer 21 |
|---|---|---|
| Monomers to be copolymerized | BzA/nBA/AA | BzAm/nBA/P-1M |
| Composition fraction (mass fraction) | 65/20/15 | 56/17/27 |
| Thiol compound | S7: 28 parts | S7: 28 parts |
| Polymer structure | $R_3$—(O—X—S—$R_3'$)$_{n3}$ | $R_3$—(O—X—S—$R_3'$)$_{n3}$ |
| Number of arms | 9 | 9 |
| Number-average molecular weight (Mn) | 4,200 | 4,300 |
| Weight-average molecular weight (Mw) | 6,200 | 6,500 |
| Molecular weight distribution [Mw/Mn] | 1.48 | 1.51 |

TABLE 9-continued

|  | Polymer 15 | Polymer 21 |
|---|---|---|
| Acid value [mgKOH/g] | 91 | 92 |

(Polymer 22)

Polymer 22 having a different number-average molecular weight was synthesized by the same method as the method of synthesizing the polymer 21 except that, while the same monomers and central compound as those of the polymer 21 were used, the proportion of the central compound was changed as shown in the following table. Table 10 below shows the respective physical properties of the polymers 22 collectively.

TABLE 10

|  | Polymer 22 |
|---|---|
| Thiol compound | S7: 10 |
| Polymer structure | $R_3$—(O—X—S—$R_3'$)$_{n3}$ |
| Number of arms | 9 |
| Number-average molecular weight (Mn) | 12,000 |
| Weight-average molecular weight (Mw) | 18,000 |
| Molecular weight distribution [Mw/Mn] | 1.50 |
| Acid value [mgKOH/g] | 107 |

(Polymers 23 to 28)

Polymers 23 to 28 having different acid values were each synthesized by the same method as the method of synthesizing the polymer 1 except that the composition fraction (mass fraction) among the monomers to be copolymerized of the polymer 1 was changed as shown in Table 11 below. Table 11 below shows the respective physical properties of the polymers 23 to 28 collectively. It should be noted that Table 11 shows the respective physical properties of the polymer 1 synthesized in the foregoing as well.

TABLE 11

|  | Polymer | | | | | | |
|---|---|---|---|---|---|---|---|
|  | 1 | 23 | 24 | 25 | 26 | 27 | 28 |
| Monomers to be copolymerized | BzA/nBA/AA | BzA/nBA/AA | BzA/nBA/AA | BzA/nBA/AA | BzA/nBA/AA | BzA/nBA/AA | BzA/nBA/AA |
| Composition fraction (mass fraction) | 65/20/15 | 76/20/4 | 73.5/20/6.5 | 73.4/20/6.6 | 60.2/20/19.8 | 60/20/20 | 47/20/33 |
| Thiol compound | S1: 10 parts | S1: 10 parts | S1: 10 parts | S1: 10 parts | S1: 10 parts | S1: 10 parts | S1: 10 parts |
| Polymer structure | | | | $R_3$—(O—X—S—$R_3'$)$_{n3}$ | | | |
| Number of arms | 4 | 4 | 4 | 4 | 4 | 4 | 4 |
| Number-average molecular weight (Mn) | 4,000 | 4,000 | 4,000 | 4,000 | 4,000 | 4,000 | 4,000 |
| Weight-average molecular weight (Mw) | 5,200 | 5,200 | 5,200 | 5,200 | 5,200 | 5,200 | 5,200 |
| Molecular weight distribution [Mw/Mn] | 1.30 | 1.30 | 1.30 | 1.30 | 1.30 | 1.30 | 1.30 |
| Acid value [mgKOH/g] | 106 | 30 | 49 | 50 | 150 | 151 | 250 |

(Polymers 29 to 32)

Polymers 29 to 32 having different proportions of the aromatic monomer were each synthesized by the same method as the method of synthesizing the polymer 1 except that the composition fraction (mass fraction) among the monomers to be copolymerized and the proportion of the central compound of the polymer 1 were changed as shown in Table 12 below. Table 12 below shows the respective physical properties of the polymers 29 to 32 collectively. It should be noted that Table 12 shows the respective physical properties of the polymer 1 synthesized in the foregoing as well.

TABLE 12

|  | Polymer | | | | |
|---|---|---|---|---|---|
|  | 1 | 29 | 30 | 31 | 32 |
| Monomers to be copolymerized | BzA/nBA/AA | BzA/nBA/AA | BzA/nBA/AA | BzA/AA | BzA/AA |
| Composition fraction (mass fraction) | 65/20/15 | 32/53/15 | 33/52/15 | 93/7 | 93/7 |

TABLE 12-continued

|  | Polymer | | | | |
|---|---|---|---|---|---|
|  | 1 | 29 | 30 | 31 | 32 |
| Thiol compound | S1: 10 parts | S1: 10 parts | S1: 10 parts | S1: 10 parts | S1: 8 parts |
| Polymer structure |  | $R_3$—(O—X—S—$R_3'$)$_{n3}$ | | | |
| Number of arms | 4 | 4 | 4 | 4 | 4 |
| Number-average molecular weight (Mn) | 4,000 | 4,000 | 4,000 | 4,000 | 4,300 |
| Weight-average molecular weight (Mw) | 5,200 | 5,200 | 5,200 | 5,200 | 5,600 |
| Molecular weight distribution [Mw/Mn] | 1.30 | 1.30 | 1.30 | 1.30 | 1.30 |
| Acid value [mgKOH/g] | 106 | 106 | 106 | 50 | 51 |
| Mass fraction of aromatic monomer to star polymer [%] | 59 | 29 | 30 | 85 | 86 |

(Polymers 33 and 34)

Polymers 33 and 34 having different mass fractions of the aromatic monomer and the acid monomer with respect to the arm were each synthesized by the same method as the method of synthesizing the polymer 1 except that the composition fraction (mass fraction) among the monomers to be copolymerized and the proportion of the central compound of the polymer 1 were changed as shown in Table 13 below. Table 13 below shows the respective physical properties of the polymers 33 and 34 collectively. It should be noted that Table 13 shows the respective physical properties of the polymer 1 synthesized in the foregoing as well.

TABLE 13

|  | Polymer | | |
|---|---|---|---|
|  | 1 | 33 | 34 |
| Monomers to be copolymerized | BzA/nBA/AA | BzA/nBA/AA | BzA/nBA/AA |
| Composition fraction (mass fraction) | 65/20/15 | 32/61/7 | 33/60/7 |
| Thiol compound | S1: 10 parts | S1: 8 parts | S1: 10 parts |
| Polymer structure | $R_3$—(O—X—S—$R_3'$)$_{n3}$ | | |
| Number of arms | 4 | 4 | 4 |
| Number-average molecular weight (Mn) | 4,000 | 4,300 | 4,000 |
| Weight-average molecular weight (Mw) | 5,200 | 5,600 | 5,200 |
| Molecular weight distribution [Mw/Mn] | 1.30 | 1.30 | 1.30 |
| Acid value [mgKOH/g] | 106 | 51 | 50 |
| Mass fraction of aromatic monomer to star polymer [%] | 59 | 30 | 30 |
| Mass fraction of aromatic monomer and acid monomer to arm [%] | 80 | 39 | 40 |

(Polymer 35)

A polymer 35 is a star polymer used in a reference example of the present invention. The polymer 35 different from the polymer 1 in the bonding mode between the central skeleton and each arm was synthesized by the same method as the method of synthesizing the polymer 1 except that the central compound of the polymer 1 was changed to PEMP. Table 14 below shows the respective physical properties of the polymer 35 collectively.

TABLE 14

|  | Polymer 35 |
|---|---|
| Thiol compound | PEMP: 12 parts |
| Polymer structure | R—(O—CO—X—S—R')$_n$ |
| Number of arms | 4 |
| Number-average molecular weight (Mn) | 4,000 |
| Weight-average molecular weight (Mw) | 5,100 |
| Molecular weight distribution [Mw/Mn] | 1.28 |
| Acid value [mgKOH/g] | 104 |

(Polymer 36)

A polymer 36 is a star polymer used in a comparative example of the present invention. This polymer is described as a star polymer having a structure of the general formula (3), for convenience, but does not satisfy the condition of $R_3'$ of the present invention. This polymer does not contain any aromatic (meth)acrylate or aromatic (meth)acrylamide as a monomer in its copolymer chains. The polymer 36 was synthesized in the same manner as in the polymer 1 except that BzMA as the aromatic (meth)acrylate monomer of the polymer 1 was changed to St which was not an aromatic (meth) acrylate monomer. Table 15 below shows the respective physical properties of the polymer 36 collectively.

TABLE 15

|  | Polymer 36 |
|---|---|
| Thiol compound | S1: 10 parts |
| Polymer structure | $R_3$—(O—X—S—$R_3'$)$_{n3}$ |
| Number of arms | 4 |
| Number-average molecular weight (Mn) | 4,000 |
| Weight-average molecular weight (Mw) | 5,200 |
| Molecular weight distribution [Mw/Mn] | 1.30 |
| Acid value [mgKOH/g] | 106 |

(Polymer 37)

A polymer 37 is a star polymer used in a comparative example of the present invention. In this polymer, each copolymer chain of which the star polymer is formed is not formed of an aromatic (meth)acrylate or an aromatic (meth) acrylamide and an acid monomer or a salt thereof. The polymer was produced in accordance with the method described in Example 1 of Japanese Patent Application Laid-Open No. 2001-40256. The central compound is trihydroxybenzene, the monomer of which each arm is formed is ethylene oxide, and the number of arms is three. Table 16 below shows the respective physical properties of the polymer 37 collectively.

TABLE 16

|  | Polymer 37 |
| --- | --- |
| Number of arms | 3 |
| Number-average molecular weight (Mn) | 2,500 |
| Weight-average molecular weight (Mw) | 3,500 |
| Molecular weight distribution [Mw/Mn] | 1.40 |
| Acid value [mgKOH/g] | 0 |

(Polymer 38)

A polymer 38 is a star polymer used in a comparative example of the present invention. In this polymer, each copolymer chain of which the star polymer is formed is not formed of an aromatic (meth)acrylate or an aromatic (meth)acrylamide and an acid monomer or a salt thereof. The polymer was produced in accordance with the method described in Example 15 of Japanese Patent Application Laid-Open No. 2001-40256. The central compound is TMMP, the monomer of which each arm is formed is N,N-dimethylacrylamide, and the number of arms is three. Table 17 below shows the respective physical properties of the polymer 38 collectively.

TABLE 17

|  | Polymer 38 |
| --- | --- |
| Number of arms | 3 |
| Number-average molecular weight (Mn) | 1,000 |
| Weight-average molecular weight (Mw) | 1,500 |
| Molecular weight distribution [Mw/Mn] | 1.5 |
| Acid value [mgKOH/g] | 0 |

(Polymer 39)

A polymer 39 is a star polymer used in a comparative example of the present invention. In this polymer, each copolymer chain of which the star polymer is formed is not formed of an aromatic (meth)acrylate or an aromatic (meth)acrylamide and an acid monomer or a salt thereof. The polymer was produced in accordance with the method described in Reference Example 1 of Japanese Patent Application Laid-Open No. H09-249709. The central compound and its composition fraction is 9 parts of PEMG, the monomers of which each arm is formed and the composition fraction among them are as follows: 50 parts of nBA, 40 parts of 2EHA, and 10 parts of HEA, and the number of arms is four. Table 18 below shows the respective physical properties of the polymer 39 collectively.

TABLE 18

|  | Polymer 39 |
| --- | --- |
| Number of arms | 3 |
| Number-average molecular weight (Mn) | 4,500 |
| Weight-average molecular weight (Mw) | 6,800 |
| Molecular weight distribution [Mw/Mn] | 1.51 |
| Acid value [mgKOH/g] | 0 |

(Polymer 40)

A polymer 40 is a polymer used in a comparative example of the present invention, and the synthesized polymer 40 is not a star polymer, though the raw material contains a star polymer. In other words, each copolymer chain of which such star polymer as used in the present invention is formed is not formed from an aromatic (meth)acrylate or an aromatic (meth)acrylamide and an acid monomer or a salt thereof. The polymer was produced in accordance with the method described in Production Example 1 of Japanese Patent Application Laid-Open No. S59-124922. A polymer synthesized by the following procedure is not a star polymer: the molecules of a pentaerythritol polymer which is a star polymer are crosslinked with an isophorone-type isocyanate, and phthalic anhydride is added to the hydroxyl group of the pentaerythritol polymer. Table 19 below shows the respective physical properties of the polymer 40 collectively.

TABLE 19

|  | Polymer 40 |
| --- | --- |
| Number of arms | 4 |
| Number-average molecular weight (Mn) | 1,100 |
| Weight-average molecular weight (Mw) | 2,400 |
| Molecular weight distribution [Mw/Mn] | 2.18 |
| Acid value [mgKOH/g] | 20 |

(Polymer 41)

A polymer 41 is a star polymer used in a comparative example of the present invention. This star polymer does not have any central skeleton that can be isolated, and each copolymer chain of which the star polymer is formed is not formed from any aromatic (meth)acrylate or aromatic (meth)acrylamide. The polymer was produced in accordance with the method of synthesizing a star polymer 1 described in Japanese Patent Application Laid-Open No. 2000-169771. Monomers of which each arm is formed are nBMA and MAA none of which is an aromatic (meth)acrylate or aromatic (meth)acrylamide. This star polymer is obtained by crosslinking EGDMA attached to one terminal of each arm. The monomers of which each arm is formed and the composition fraction among them are as follows: 69 parts of nBMA, 17 parts of MAA, and 14 parts of EGDMA. The number of arms cannot be uniquely determined because the number cannot be controlled and has a distribution. Table 20 below shows the respective physical properties of the polymer 41 collectively.

TABLE 20

|  | Polymer 41 |
| --- | --- |
| Number of arms | Uncontrollable |
| Number-average molecular weight (Mn) | 20,000 |
| Weight-average molecular weight (Mw) | 28,000 |
| Molecular weight distribution [Mw/Mn] | 1.40 |
| Acid value [mgKOH/g] | 1,100 |

(Polymer 42)

A polymer 42 is a star polymer used in a comparative example of the present invention. This star polymer does not have a sulfur atom (S in respective general formulae (1) to (3)), which is essential for the star polymer having a structure represented by any one of the general formulae (1) to (3) of the present invention. Further, the polymer 42 does not have any central skeleton that can be isolated. As in the case of the polymer 41, the method of synthesizing a star polymer 1 described in Japanese Patent Application Laid-Open No. 2000-169771 was employed for the synthesis of the polymer, and monomers of which each arm was formed were as shown in Table 21 below. The symbol "BzMA/nBMA/MAA" in Table 21 below shows that the three kinds of monomers are randomly placed. In addition, the symbol "//EGDMA" in the table shows that EGDMA is copolymerized as a block to one terminal of each arm. In Japanese Patent Application Laid- Open No. 2000-169771, neither an aromatic (meth)acrylate nor an aromatic (meth)acrylamide is included in monomers of which each arm is formed. However, the case where BzMA which is an aromatic (meth)acrylate is copolymerized is described for easy performance comparison. Table 21 below shows the respective physical properties of the polymer 42.

TABLE 21

|  | Polymer 42 |
|---|---|
| Monomers to be copolymerized | BzMA/nBMA/MAA//EGDMA |
| Composition fraction (mass fraction) | 65/6/15//14 |
| Number of arms | Uncontrollable |
| Number-average molecular weight (Mn) | 7,000 |
| Weight-average molecular weight (Mw) | 9,000 |
| Molecular weight distribution [Mw/Mn] | 1.29 |
| Acid value [mgKOH/g] | 98 |

(Polymer 43)

A polymer 43 is a linear polymer used in comparative example of the present invention. This polymer was obtained by living anion polymerization. The synthesis was performed with reference to the method described in "New Polymer Experiment 2", Synthesis and Reaction of Polymer (1) Synthesis of Addition Polymer, edited by the Society of Polymer Science. The monomer of the linear polymer was as shown in Table 22 below. Upon polymerization, an experimental apparatus and an experimental procedure adopted were those of Experimental Example 2.4.1 described on page 212 of "New Polymer Experiment 2", Synthesis and Reaction of Polymer (1) Synthesis of Addition Polymer, edited by the Society of Polymer Science. The polymerization was performed by using 100 parts of toluene as a solvent and 2 parts of tert-butyllithium/tributylaluminum as an initiator at a temperature of −78° C. for a reaction time of 24 hours. After the reaction, hydrochloric acid/methanol was added to the resultant so that a termination reaction was performed. Simultaneously with the termination reaction, tBMA was subjected to a hydrolysis reaction so as to become MAA. After that, excessive hexane was added to the resultant so that a polymer was precipitated. Then, the polymer was dried in a vacuum. An equivalent molar amount of KOH with respect to the acid value of the polymer and an appropriate amount of water were added to the polymer. Thus, a 25% aqueous solution of the polymer 43 was obtained. Table 22 below shows the respective physical properties of the polymer 43.

TABLE 22

|  | Polymer 43 |
|---|---|
| Monomers to be copolymerized | BzMA/nBMA/tBMA |
| Composition fraction (mass fraction) | 63/20/17 |
| Number-average molecular weight (Mn) | 4,000 |
| Weight-average molecular weight (Mw) | 4,800 |
| Molecular weight distribution [Mw/Mn] | 1.20 |
| Acid value [mgKOH/g] | 98 |

<Preparation of Pigment Dispersion Liquids>
(Preparation of Black Pigment Dispersion Liquids)

| Polymer 1 | 20 parts |
|---|---|
| 2-pyrrolidone | 10 parts |
| Ion-exchanged water | 55 parts |

The above components were mixed, and the mixture was heated to 70° C. in a water bath. Then, the mixture was stirred so that the resin component was completely dissolved. Then, 15 parts of carbon black (NIPex 180IQ; manufactured by Degussa Co.) was added to the resultant solution, and the contents were subjected to premixing for 30 minutes. After that, the resultant was subjected to a dispersion treatment under the following conditions. Thus, a black pigment dispersion liquid 1 was obtained.

Dispersing machine: An ultra-high pressure homogenizer NM2-L200AR (manufactured by YOSHIDA KIKAI CO., LTD.)
Treatment pressure: 150 MPa
Treatment paths: 10 paths In addition, black pigment dispersion liquids 2 to 43 were each produced in the same manner as in the black pigment dispersion liquid 1 except that each of the polymers 2 to 43 was used instead of the polymer 1 of the black pigment dispersion liquid 1.

(Preparation of Cyan Pigment Dispersion Liquid)

| Polymer 1 | 20 parts |
|---|---|
| 2-pyrrolidone | 10 parts |
| Ion-exchanged water | 55 parts |

The above components were mixed, and the mixture was heated to 70° C. in a water bath so that the resin component was completely dissolved. Then, 15 parts of a cyan pigment (IRGALITE Blue 8700; manufactured by Ciba Specialty Chemicals Inc.) was added to the resultant solution, and the contents were subjected to premixing for 30 minutes. After that, the resultant was subjected to a dispersion treatment under the following conditions. Thus, a cyan pigment dispersion liquid was obtained.

Dispersing machine: A bead mill UAM-015 (product name) (manufactured by KOTOBUKI INDUSTRIES CO., LTD.)
Beads used: Zirconia beads having a diameter of 0.05 mm
Filling rate of beads: 70% (in terms of bulk specific gravity)
Number of revolutions of rotor: 42.1 Hz (Preparation of Magenta Pigment Dispersion Liquid)

A magenta pigment dispersion liquid was prepared in the same manner as in the above cyan pigment dispersion liquid except that the pigment in the cyan pigment dispersion liquid was changed from the cyan pigment to a magenta pigment (CROMOPHTAL Pink PT; manufactured by Ciba Specialty Chemicals Inc.).

(Preparation of Yellow Pigment Dispersion Liquid)

A yellow pigment dispersion liquid was prepared in the same manner as in the above cyan pigment dispersion liquid except that the pigment in the cyan pigment dispersion liquid was changed from the cyan pigment to a yellow pigment (IRGALITE Yellow GS; manufactured by Ciba Specialty Chemicals Inc.).

<Preparation of Inks>
(Preparation of Black Inks)

A black ink 1 was obtained by mixing the following respective components including the black pigment dispersion liquid 1 described above.

| Black pigment dispersion liquid 1 (5 parts in terms of pigment concentration) | 33 parts |
|---|---|
| Glycerin | 10 parts |
| Ethylene glycol | 5 parts |
| PEG 1,000 | 5 parts |
| AE 100 | 0.5 part |
| Ion-exchanged water | 46.5 parts |

In addition, black inks 2 to 43 were each prepared in the same manner as in the black ink 1 except that each of the black pigment dispersion liquids 2 to 43 was used instead of the black pigment dispersion liquid 1 of the black ink 1.

(Preparation of Cyan Ink)

A cyan ink was prepared in the same manner as in the black ink 1 except that the black pigment dispersion liquid 1 in the black ink 1 was changed to the cyan pigment dispersion liquid.

(Preparation of Magenta Ink)

A magenta ink was prepared in the same manner as in the black ink 1 except that the black pigment dispersion liquid 1 in the black ink 1 was changed to the magenta pigment dispersion liquid.

(Preparation of Yellow Ink)

A yellow ink was prepared in the same manner as in the black ink 1 except that the black pigment dispersion liquid 1 in the black ink 1 was changed to the yellow pigment dispersion liquid.

<Evaluation of Black Inks>

(Optical Density)

Each of the black inks obtained in the foregoing was put into an ink cartridge, and the ink cartridge was mounted on an ink jet recording apparatus PIXUS iP4300 (manufactured by Canon Inc.). Then, a solid image having a recording duty of 100% was recorded on a Canon Plain Paper White SW-101 (manufactured by Canon Inc.) while the recording mode of the apparatus was set to a plain paper/standard mode. Thus, a recorded article was produced. The resultant recorded article was evaluated for its optical density by measuring the optical density $OD_1$ in a solid image portion. The optical density was measured with a reflection densitometer RD-19I (manufactured by Gretag Macbeth Co.). Evaluation criteria for the optical density are as described below. Table 23 shows the results of the evaluation.

A: $1.5<OD_1$
B: $1.4<OD_1 \leq 1.5$
C: $1.2<OD_1 \leq 1.4$
D: $1.0<OD_1 \leq 1.2$
E: $OD_1 \leq 1.0$ or the solid image was blurred (an ejection failure occurred).

(Character Quality)

Each of the black inks obtained in the foregoing was put into an ink cartridge, and the ink cartridge and a BCI-7e Yellow Ink (manufactured by Canon Inc.) as a dye ink were mounted on an ink jet recording apparatus PIXUS iP4300 (manufactured by Canon Inc.). Then, the following recorded article was produced on a Canon Plain Paper White SW-101 (manufactured by Canon Inc.) while the recording mode of the apparatus was set to a plain paper/standard mode: characters were recorded with the black ink on a solid image formed with the dye ink. The resultant recorded article was evaluated for its bleeding resistance by measuring the raggedness value Rag in a character portion. The raggedness value was measured with an image evaluating apparatus Personal IAS (manufactured by QEA). Evaluation criteria for the bleeding resistance are as described below. Table 23 shows the results of the evaluation.

A: $Rag<10$
B: $10 \leq Rag<15$
C: $15 \leq Rag<20$
D: $20 \leq Rag<30$
E: $Rag \leq 30$ or the character was blurred (an ejection failure occurred).

(Optical Density after Storage)

Each of the black inks obtained in the foregoing was stored in a thermostatic bath having a temperature of 60° C. for 1 week. After that, the ink was cooled to room temperature, and was then evaluated for its storage stability by the same evaluation method as that for the above optical density on the basis of the same evaluation criteria as those for the above optical density. Table 23 shows the results of the evaluation.

(Character Quality after Storage)

Each of the black inks obtained in the foregoing was stored in a thermostatic bath having a temperature of 60° C. for 1 week. After that, the ink was cooled to room temperature, and was then evaluated for its storage stability by the same evaluation method as that for the above character quality on the basis of the same evaluation criteria as those for the above character quality. Table 23 shows the results of the evaluation.

In the above four kinds of evaluation items, evaluation criteria A to C were defined as acceptable levels, and evaluation criteria D and E were defined as unacceptable levels.

TABLE 23

|  | Black ink No. | Polymer in ink | Optical density | Character quality | Optical density after storage | Character quality after storage |
|---|---|---|---|---|---|---|
| Example 1 | 1 | 1 | A | A | A | A |
| Example 2 | 2 | 2 | A | A | A | A |
| Example 3 | 3 | 3 | A | A | A | B |
| Example 4 | 4 | 4 | A | A | B | B |
| Example 5 | 5 | 5 | A | A | A | A |
| Example 6 | 6 | 6 | B | A | B | A |
| Example 7 | 7 | 7 | A | A | A | B |
| Example 8 | 8 | 8 | B | A | B | B |
| Example 9 | 9 | 9 | A | A | A | A |
| Example 10 | 10 | 10 | B | B | B | B |
| Example 11 | 11 | 11 | A | A | B | A |
| Example 12 | 12 | 12 | B | B | B | B |
| Example 13 | 13 | 13 | A | A | A | A |
| Example 14 | 14 | 14 | A | A | A | A |
| Example 15 | 15 | 15 | A | B | A | B |
| Example 16 | 16 | 16 | A | A | A | B |
| Example 17 | 17 | 17 | A | A | A | B |
| Example 18 | 18 | 18 | C | B | C | B |
| Example 19 | 19 | 19 | B | B | B | C |
| Example 20 | 20 | 20 | A | B | A | B |
| Example 21 | 21 | 21 | C | B | C | C |
| Example 22 | 22 | 22 | C | C | C | C |
| Example 23 | 23 | 23 | A | A | C | B |
| Example 24 | 24 | 24 | A | A | B | B |

TABLE 23-continued

|  | Black ink No. | Polymer in ink | Optical density | Character quality | Optical density after storage | Character quality after storage |
|---|---|---|---|---|---|---|
| Example 25 | 25 | 25 | A | A | A | A |
| Example 26 | 26 | 26 | A | A | A | A |
| Example 27 | 27 | 27 | A | A | B | B |
| Example 28 | 28 | 28 | B | B | B | B |
| Example 29 | 29 | 29 | A | A | C | C |
| Example 30 | 30 | 30 | A | A | A | A |
| Example 31 | 31 | 31 | A | A | A | A |
| Example 32 | 32 | 32 | B | B | B | B |
| Example 33 | 33 | 33 | A | A | C | C |
| Example 34 | 34 | 34 | A | A | A | A |
| Reference Example 1 | 35 | 35 | A | A | C | C |
| Comparative Example 1 | 36 | 36 | D | E | E | E |
| Comparative Example 2 | 37 | 37 | E | E | E | E |
| Comparative Example 3 | 38 | 38 | E | E | E | E |
| Comparative Example 4 | 39 | 39 | —(*1) | —(*1) | —(*1) | —(*1) |
| Comparative Example 5 | 40 | 40 | E | E | E | E |
| Comparative Example 6 | 41 | 41 | E | E | E | E |
| Comparative Example 7 | 42 | 42 | E | D | E | E |
| Comparative Example 8 | 43 | 43 | D | E | E | E |

(*1)Unable to disperse

<Evaluation of Color Inks>

(Chroma)

Each of the color inks obtained in the foregoing was put into an ink cartridge, and the ink cartridge was mounted on an ink jet recording apparatus PIXUS iP4300 (manufactured by Canon Inc.). Then, solid images each having a recording duty of 100% were recorded on a Canon Plain Paper White SW-101 (manufactured by Canon Inc.) while the recording mode of the apparatus was set to a plain paper/standard mode. Thus, a recorded article was produced. The resultant recorded article was evaluated for its chroma by measuring the chroma C* in a solid image portion. To be specific, coordinates a* and b* of each color image in the L*a*b* colorimetric system as a color difference representation method stipulated by CIE were measured with a reflection densitometer RD-19I (manufactured by Gretag Macbeth Co.), and the chroma C* defined by the following equation was calculated. Evaluation for chroma was performed on the basis of the resultant C*. It should be noted that the larger the chroma C*, the higher the colorability of the image. Table 24 shows the results of the evaluation.

$$C^* = \{(a^*)^2 + (b^*)^2\}^{1/2}$$

(Character Quality)

Each of the color inks obtained in the foregoing was put into an ink cartridge. Then, as in the case of the evaluation of black inks, the color ink cartridge and a BCI-7e Black Ink (manufactured by Canon Inc.) as a dye ink were mounted on an ink jet recording apparatus PIXUS iP4300 (manufactured by Canon Inc.). Then, the following recorded article was produced on a Canon Plain Paper White SW-101 (manufactured by Canon Inc.) while the recording mode of the apparatus was set to a plain paper/standard mode: characters were recorded with the dye ink on a solid image formed with each color ink. The resultant recorded article was evaluated for its bleeding resistance by measuring the raggedness value Rag in a character portion. The raggedness value was measured with an image evaluating apparatus Personal IAS (manufactured by QEA). Table 24 shows the results of the evaluation.

(Chroma after Storage)

Each of the black inks obtained in the foregoing was stored in a thermostatic bath having a temperature of 60° C. for 1 week. After that, the ink was cooled to room temperature, and was then evaluated for its storage stability by the same evaluation method as that for the above chroma on the basis of the same evaluation criteria as those for the above chroma. Table 24 shows the results of the evaluation.

(Character Quality after Storage)

Each of the black inks obtained in the foregoing was stored in a thermostatic bath having a temperature of 60° C. for 1 week. After that, the ink was cooled to room temperature, and was then evaluated for its storage stability by the same evaluation method as that for the above character quality on the basis of the same evaluation criteria as those for the above character quality. Table 24 shows the results of the evaluation.

<Preparation of Reaction Liquid>

The following respective components were mixed, and the mixture was filtrated. Thus, a reaction liquid was prepared.

| Diethylene glycol | 10.0 parts |
|---|---|
| Methyl alcohol | 5.0 parts |
| Magnesium nitrate | 3.0 parts |
| AE 100 | 0.1 part |
| Ion-exchanged water | 81.9 parts |

<Evaluation of Set of Inks and Reaction Liquid>

The reaction liquid obtained in the foregoing, and the black ink 1 and the respective color inks, i.e., the cyan, magenta, and yellow inks; were combined. Thus, a set of the inks and the reaction liquid was obtained. The reaction liquid of which the set was formed was applied to a Canon Plain Paper White SW-101 (manufactured by Canon Inc.) in advance. After that, the black ink 1 and the respective color inks, i.e., the cyan, magenta, and yellow inks, were recorded so that the reaction liquid and each ink contacted each other. Thus, a recorded article was produced. The resultant recorded article was evaluated for each of its optical density, chroma, and character quality in the same manner as that described above on the basis of the same criteria as those described above except that the reaction liquid was used. Table 24 shows the results of the evaluation.

TABLE 24

| | | Example 35 Ink set | Example 36 Set of inks and reaction liquid |
|---|---|---|---|
| Optical density | Black ink | A | A |
| Chroma | Cyan ink | 52 | 56 |
| | Magenta ink | 60 | 67 |
| | Yellow ink | 85 | 90 |
| Character quality | Black ink | A | A |
| | Cyan ink | A | A |
| | Magenta ink | A | A |
| | Yellow ink | A | A |
| Optical density after storage | Black ink | A | |
| Chroma after storage | Cyan ink | A | |
| | Magenta ink | A | |
| | Yellow ink | A | |
| Character quality after storage | Black ink | A | |
| | Cyan ink | A | |
| | Magenta ink | A | |
| | Yellow ink | A | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-260618, filed Oct. 7, 2008, which is hereby incorporated by reference herein in its entirety.

What is claimed is:

1. An ink jet ink comprising:
a pigment;
an aqueous medium; and
a dispersion polymer for the pigment,
wherein the dispersion polymer is a star polymer having a structure represented by at least one formula selected from the group consisting of the following general formulae (1) to (3):

  General formula (1)

$$R_1-(S-R_1')_{n1}$$

  General formula (2)

$$R_2-(X-S-R_2')_{n2}$$

  General formula (3)

$$R_3-(O-X-S-R_3')_{n3}$$

where $R_1$ to $R_3$ each represent a trifunctional or higher functional organic residue containing no ester bond, X represents an alkylene group, $R_1'$ to $R_3'$ each represent a copolymer chain of at least one monomer selected from the group consisting of aromatic (meth)acrylates and aromatic (meth)acrylamides and at least one monomer selected from the group consisting of acid monomers and salts of the acid monomers, and $n_1$ to $n_3$ each represent an integer of 3 or more.

2. An ink jet ink according to claim 1, wherein the polymer has a number-average molecular weight (Mn) in terms of polystyrene obtained by gel permeation chromatography (GPC) of 1,000 to 10,000.

3. An ink jet ink according to claim 1, wherein $n_1$ to $n_3$ each represent 3 to 8.

4. An ink jet ink according to claim 1, wherein $R_1$ to $R_3$ each represent a residue of a sulfur-containing organic compound.

5. An ink jet ink according to claim 1, wherein the at least one monomer selected from the group consisting of the acid monomers and the salts of the acid monomers is one of a monomer having a carboxyl group and a salt thereof.

6. An ink jet ink according to claim 5, wherein the one of the monomer having a carboxyl group and the salt thereof is at least one compound selected from the group consisting of acrylic acid, methacrylic acid, and salts thereof.

7. An ink jet ink according to claim 1, wherein the at least one monomer selected from the group consisting of the aromatic (meth)acrylates and the aromatic (meth)acrylamides is benzyl (meth)acrylate.

8. An ink jet ink according to claim 1, wherein a mass fraction of a unit of the at least one monomer selected from the group consisting of the aromatic (meth)acrylates and the aromatic (meth)acrylamides in the polymer is 30.0 mass % to 85.0 mass % with reference to a total mass of the polymer.

9. An ink jet ink according to claim 1, wherein the polymer has an acid value of 50 mgKOH/g to 150 mgKOH/g.

10. An ink jet recording method comprising ejecting ink according to an ink jet system to perform recording on a recording medium, wherein the ink used in the ink jet recording method is the ink jet ink according to claim 1.

11. An ink cartridge comprising an ink storage portion for storing ink, wherein the ink stored in the ink storage portion is the ink jet ink according to claim 1.

12. An ink jet ink according to claim 1, wherein the content of the star polymer in the ink is from 0.1 mass % to 15.0 mass % with reference to the total mass of the ink.

13. An ink jet ink according to claim 1, wherein the content of the star polymer in the ink is from 0.1 mass % to 5.0 mass % with reference to the total mass of the ink.

14. An ink jet ink according to claim 1, wherein the content of the pigment in ink is from 2.0 mass % to 12.0 mass % with reference to the total mass of the ink.

* * * * *